(12) United States Patent
Ahn

(10) Patent No.: US 12,370,989 B2
(45) Date of Patent: Jul. 29, 2025

(54) ELECTRO-HYDRAULIC BRAKE DEVICE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 431 days.

(21) Appl. No.: 17/898,541

(22) Filed: Aug. 30, 2022

(65) Prior Publication Data

US 2023/0398971 A1    Dec. 14, 2023

(30) Foreign Application Priority Data

Jun. 13, 2022    (KR) .................. 10-2022-0071424

(51) Int. Cl.
| | | |
|---|---|---|
| B60T 13/16 | (2006.01) | |
| B60T 7/04 | (2006.01) | |
| B60T 8/36 | (2006.01) | |
| B60T 8/94 | (2006.01) | |
| B60T 13/14 | (2006.01) | |
| B60T 13/18 | (2006.01) | |
| B60T 13/66 | (2006.01) | |
| B60T 13/68 | (2006.01) | |
| B60T 17/04 | (2006.01) | |

(52) U.S. Cl.
CPC .................. *B60T 8/94* (2013.01); *B60T 7/04* (2013.01); *B60T 8/368* (2013.01); *B60T 13/142* (2013.01); *B60T 13/148* (2013.01); *B60T 13/18* (2013.01); *B60T 13/662* (2013.01); *B60T 13/686* (2013.01); *B60T 17/04* (2013.01); *B60T 2270/402* (2013.01); *B60T 2270/413* (2013.01)

(58) Field of Classification Search
CPC .............. B60T 8/368; B60T 2270/402; B60T 2270/413; B60T 8/94; B60T 8/148
See application file for complete search history.

(56) References Cited

U.S. PATENT DOCUMENTS

| | | | |
|---|---|---|---|
| 8,152,244 B2 * | 4/2012 | Yanai .................. | B60W 10/188 303/122.09 |
| 8,894,159 B2 * | 11/2014 | Nakata .................. | B60T 17/221 303/191 |
| 10,358,119 B2 * | 7/2019 | Besier .................. | B60T 13/142 |

(Continued)

FOREIGN PATENT DOCUMENTS

| | | |
|---|---|---|
| DE | 102011080312 A1 | 2/2012 |
| DE | 102014225958 A1 | 6/2016 |

(Continued)

*Primary Examiner* — Bradley T King
(74) *Attorney, Agent, or Firm* — NovoTechIP International PLLC

(57) ABSTRACT

Proposed is an electro-hydraulic brake device including a main brake unit configured to provide a braking fluid to a plurality of wheel cylinders by driving a motor, a storage unit connected to the main brake unit, and configured to store the braking fluid, an auxiliary brake unit configured to provide the braking fluid to one or more of the wheel cylinders when an operational failure of the main brake unit occurs, and configured to divide a hydraulic line of a hydraulic circuit unit physically by a function, wherein the hydraulic circuit unit disposed at a block unit is connected to the main brake unit and the storage unit.

13 Claims, 19 Drawing Sheets

(56) References Cited

U.S. PATENT DOCUMENTS

| | | | | |
|---|---|---|---|---|
| 11,648,924 B2* | 5/2023 | Maj | ............... | B60T 8/326 |
| | | | | 303/6.01 |
| 11,745,711 B2* | 9/2023 | Drotleff | ............... | B60T 13/745 |
| | | | | 303/6.01 |
| 12,084,018 B2* | 9/2024 | Leiber | ............... | B60T 7/042 |
| 12,145,562 B2* | 11/2024 | Leiber | ............... | B60T 8/4054 |
| 2011/0175436 A1* | 7/2011 | Nakata | ............... | B60T 8/4081 |
| | | | | 303/6.01 |
| 2016/0023644 A1* | 1/2016 | Feigel | ............... | B60T 8/4081 |
| | | | | 303/3 |
| 2017/0282877 A1* | 10/2017 | Besier | ............... | B60T 8/885 |
| 2017/0361825 A1* | 12/2017 | Drumm | ............... | B60T 8/4081 |
| 2019/0001949 A1* | 1/2019 | Ying | ............... | B60T 8/4081 |
| 2019/0016321 A1* | 1/2019 | Dinkel | ............... | B60T 8/4081 |
| 2019/0308601 A1* | 10/2019 | Maj | ............... | B60T 13/161 |
| 2019/0344769 A1* | 11/2019 | Zimmermann | ............... | B60T 8/326 |
| 2020/0055504 A1* | 2/2020 | Weitze | ............... | B60T 8/4081 |
| 2020/0114894 A1* | 4/2020 | Leiber | ............... | B60T 8/368 |
| 2020/0139949 A1* | 5/2020 | Dolmaya | ............... | B60T 8/4081 |
| 2020/0172067 A1* | 6/2020 | Einig | ............... | B60T 8/409 |
| 2020/0276963 A1* | 9/2020 | Zimmermann | ............... | B60T 13/686 |
| 2020/0307538 A1* | 10/2020 | Ganzel | ............... | B60T 8/4081 |
| 2021/0031742 A1* | 2/2021 | Drotleff | ............... | B60T 13/745 |
| 2021/0053540 A1* | 2/2021 | Besier | ............... | B60T 13/58 |
| 2021/0094523 A1* | 4/2021 | Dinkel | ............... | B60T 13/745 |
| 2021/0380087 A1* | 12/2021 | Di Stefano | ............... | B60T 7/12 |
| 2022/0194339 A1* | 6/2022 | Tarandek | ............... | B60T 13/145 |
| 2023/0130785 A1* | 4/2023 | Kim | ............... | B60T 8/326 |
| | | | | 303/113.4 |
| 2023/0146934 A1* | 5/2023 | Lim | ............... | B60T 13/166 |
| | | | | 303/114.1 |
| 2023/0415723 A1* | 12/2023 | Seidel | ............... | B60T 8/366 |
| 2024/0067150 A1* | 2/2024 | Stanojkovski | ............... | B60T 13/745 |

FOREIGN PATENT DOCUMENTS

| | | |
|---|---|---|
| DE | 102015224618 A1 | 6/2016 |
| DE | 102016203119 A1 | 8/2017 |
| DE | 102017216118 A1 | 4/2018 |
| DE | 102017219000 A1 | 4/2019 |
| DE | 102019216896 A1 | 5/2020 |
| DE | 102019201536 A1 | 8/2020 |
| KR | 10-2007-0104982 A | 10/2007 |
| KR | 10-2021-0080316 A | 6/2021 |
| WO | WO-2015032637 A1 * | 3/2015 ............ B60T 8/4081 |

* cited by examiner

ELECTRO-HYDRAULIC BRAKE DEVICE

CROSS-REFERENCE TO RELATED APPLICATIONS

This application claims the benefit of priority to Korean Patent Application No. 10-2022-0071424, filed on Jun. 13, 2022, of which the disclosure is incorporated herein by reference in its entirety.

TECHNICAL FIELD

Exemplary embodiments of the present disclosure relate to an electro-hydraulic brake device, and more particularly, to an electro-hydraulic brake device, in which auxiliary braking is promptly performed when a main braking failure occurs, a hydraulic circuit is clearly distinguished for each function, a set pressure control route is diversified, and breathing quality can be improved.

BACKGROUND

In general, an electro-hydraulic brake device controls a brake pressure of each wheel by a hydraulic pressure of a master cylinder that is driven by a motor after a pedal pressure of a driver is detected by a sensor.

The electro-hydraulic brake device includes a sensor that detects a stroke distance of the pedal to determine a brake pressure desired by the driver.

In addition, the electro-hydraulic brake device includes a pedal travel simulator so that the driver feels the same pedal pressure as that of a typical hydraulic brake device.

Therefore, when the driver steps on the pedal, an electronic control unit detects a pedal pressure and supplies a hydraulic pressure to a master cylinder.

In addition, the master cylinder provides a brake hydraulic pressure to wheel cylinders of each wheel to provide a braking force to each wheel.

In the electro-hydraulic brake device of the related art, a brake hydraulic pressure is not promptly provided to a wheel cylinder when a motor is damaged. Thus, there lies a problem causing an accident. Therefore, there is a need to improve the above problem.

The related art of the present disclosure is disclosed in Korean Patent Application Publication No. 2007-0104982 (published on Oct. 30, 2007, and titled "Control apparatus for valve in electro-hydraulic brake system").

SUMMARY

Various embodiments are directed to an electro-hydraulic brake device to solve the above-described problems, and objects of the present disclosure are to provide the electro-hydraulic brake device in which auxiliary braking is promptly performed when a main braking failure occurs, a hydraulic circuit is clearly distinguished for each function, a set pressure control route is diversified, and breathing quality can be improved.

In an embodiment, an electro-hydraulic brake device according to the present disclosure includes: a main brake unit configured to provide a braking fluid to a plurality of wheel cylinders by driving a motor; a storage unit connected to the main brake unit and configured to store the braking fluid; and an auxiliary brake unit configured to provide the braking fluid to one or more of the wheel cylinders when an operational failure of the main brake unit occurs and configured to divide a hydraulic line of a hydraulic circuit unit physically by a function, wherein the hydraulic circuit unit disposed at a block unit is connected to the main brake unit and the storage unit.

In an embodiment, the main brake unit may include: a pedal cylinder unit configured to generate a hydraulic pressure when a pedal is stepped on; a master cylinder unit configured to sense the pedal and to generate the hydraulic pressure by driving the motor; a first main hydraulic unit connected to the master cylinder unit and configured to guide the braking fluid to some of the plurality of wheel cylinders; a second main hydraulic unit configured to connect the auxiliary brake unit with the master cylinder unit and configured to guide the braking fluid to the rest of the plurality of wheel cylinders; and a third main hydraulic unit configured to connect or disconnect the second main hydraulic unit to or from the first main hydraulic unit.

In an embodiment, the first main hydraulic unit may guide the braking fluid to the wheel cylinder that is arranged on a rear wheel, and the second main hydraulic unit may guide the braking fluid to the wheel cylinder that is arranged on a front wheel.

In an embodiment, the first main hydraulic unit and the auxiliary brake unit may be connected to each other so that the braking fluid is movable.

In an embodiment, the block unit may include: a block body unit; a main connection port disposed at an upper portion of the block body unit and configured to guide a connection of the main brake unit; a storage connection port disposed at the upper portion of the block body unit and configured to guide a connection of the storage unit; a wheel connection port disposed at a front portion of the block body unit and configured to guide a connection of the wheel cylinder; a pump port unit disposed at a side portion of the block body unit and configured to guide movement of the braking fluid by an electric pump unit that is driven when electric power is applied; and one or more of valve port units disposed at the block body unit, and configured to guide movement of the braking fluid by a valve unit that communicates with the hydraulic circuit unit and controls a hydraulic pressure.

In an embodiment, the hydraulic circuit unit may include: a first auxiliary flow unit configured to connect the wheel cylinder with the main brake unit to control the braking fluid, and configured to communicate with a first valve port unit; a second auxiliary flow unit configured to connect the electric pump unit with the first auxiliary flow unit to control the braking fluid and configured to communicate with a second valve port; and a third auxiliary flow unit configured to connect the first auxiliary flow unit with the electric pump unit to control the braking fluid and configured to communicate with a third valve port.

In an embodiment, the first auxiliary flow unit may include: a 1-1 flow line configured to connect the main connection port with the main brake unit to guide the braking fluid; a 1-2 flow line formed on the block body unit, configured to connect the wheel connection port with the main connection port, and configured to communicate with the first valve port unit; a 1-3 flow line configured to connect the wheel cylinder with the wheel connection port to guide the braking fluid; and a first flow valve mounted on the first valve port unit, and configured to open or close the 1-2 flow line.

In an embodiment, the second auxiliary flow unit may include: a 2-1 flow line formed on the block body unit and configured to connect the pump port unit with the 1-2 flow line to guide the braking fluid; and a second flow valve mounted on the second valve port and configured to open or close the 2-1 flow line.

In an embodiment, the second auxiliary flow unit may further include: a 2-2 flow line formed on the block body unit and configured to connect the storage connection port with the 2-1 flow line; and a 2-3 flow line configured to connect the storage unit with the storage connection port.

In an embodiment, the third auxiliary flow unit may include: a third flow line mounted on the block body unit and configured to connect the 1-2 flow line with the pump port unit to guide the braking fluid; and a third flow valve mounted on the third valve port, and configured to open or close the third flow line.

In an embodiment, the third flow valve may open the third flow line so that the braking fluid discharged from the electric pump unit is provided to the wheel cylinder.

In an embodiment, the electro-hydraulic brake device may further include a fourth auxiliary flow unit, which is configured to connect the storage unit with the third auxiliary flow unit to control the braking fluid and communicate with the fourth valve port unit.

In an embodiment, the fourth auxiliary flow unit may include: a fourth flow line formed on the block body unit, configured to connect the storage unit with the third auxiliary flow unit, and configured to communicate with the fourth valve port unit to guide the braking fluid; and a fourth flow valve mounted on the fourth valve port unit, and configured to open or close the fourth flow line.

In an embodiment, an inlet part of the pump port unit may be connected to the storage unit, and an outlet part of the pump port unit may be disposed at the side portion of the block body unit.

In an embodiment, an inlet part of the third valve port may be disposed at a rear portion of the block body unit and connected to the first auxiliary flow unit, and an outlet part of the third valve port may be connected to the third auxiliary flow unit.

In an embodiment, an inlet part of the fourth valve port unit may be disposed at the rear portion of the block body unit and connected to the storage unit, and an outlet part of the fourth valve port unit may be connected to the third auxiliary flow unit.

In an electro-hydraulic brake device according to the present disclosure, a main brake unit and an auxiliary brake unit are connected to each other using a hydraulic circuit, and when an operational failure of the main brake unit occurs, the auxiliary brake unit can be activated to perform braking.

In the electro-hydraulic brake device according to the present disclosure, a first auxiliary flow unit connects wheel cylinder with the main brake unit to control a braking fluid, a second auxiliary flow unit connects an electric pump unit with the first auxiliary flow unit to control the braking fluid, and a third auxiliary flow unit connects the first auxiliary flow unit with the electric pump unit to control the braking fluid. Therefore, the hydraulic circuit can be physically divided by a function.

In the electro-hydraulic brake device according to the present disclosure, the second auxiliary flow unit is connected to a storage unit, and the valve resistance to the braking fluid supplied for the electric pump unit is omitted. Therefore, breathing quality can be improved.

DETAILED DESCRIPTION

Figure 1:
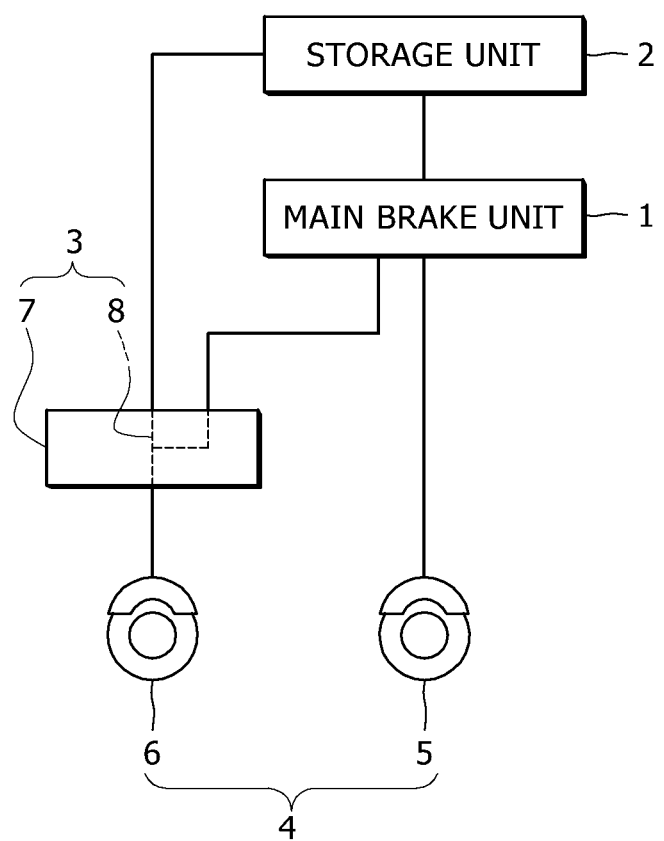
FIG. 1 is a block diagram schematically illustrating an electro-hydraulic brake device according to an embodiment of the present disclosure.

Hereinafter, an electro-hydraulic brake device will be described below with reference to the accompanying drawings through various exemplary embodiments. In such a process, for clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be stated in light of details disclosed throughout the present specification.

FIG. 1 is a block diagram schematically illustrating an electro-hydraulic brake device according to an embodiment of the present disclosure. Referring to FIG. 1, the electro-hydraulic brake device according to the embodiment of the present disclosure includes a main brake unit 1, a storage unit 2, and an auxiliary brake unit 3.

The main brake unit 1 provides a braking fluid to a plurality of wheel cylinders 4 by driving a motor. The storage unit 2 is connected to the main brake unit 1 and temporarily stores the braking fluid. The auxiliary brake unit 3 is, by a hydraulic circuit unit 8 disposed at the block unit 7, connected to the main brake unit 1 and the storage unit 2. The auxiliary brake unit 3 provides the braking fluid to some of the plurality of wheel cylinders 4 when an operational failure of the main brake unit 1 occurs. The auxiliary brake unit 3 is designed so that a hydraulic line of the hydraulic circuit unit 8 is physically divided by a function.

That is, in the electro-hydraulic brake device according to the embodiment of the present disclosure, the auxiliary brake unit 3 may be activated for an emergency braking when an operational failure of the main brake unit 1 occurs in an electric vehicle, a hybrid electric vehicle, and an autonomous vehicle. In this case, the operational failure of the main brake unit 1 may be a motor driving failure or an operational failure of various valves that control the hydraulic circuit.

Figure 2:
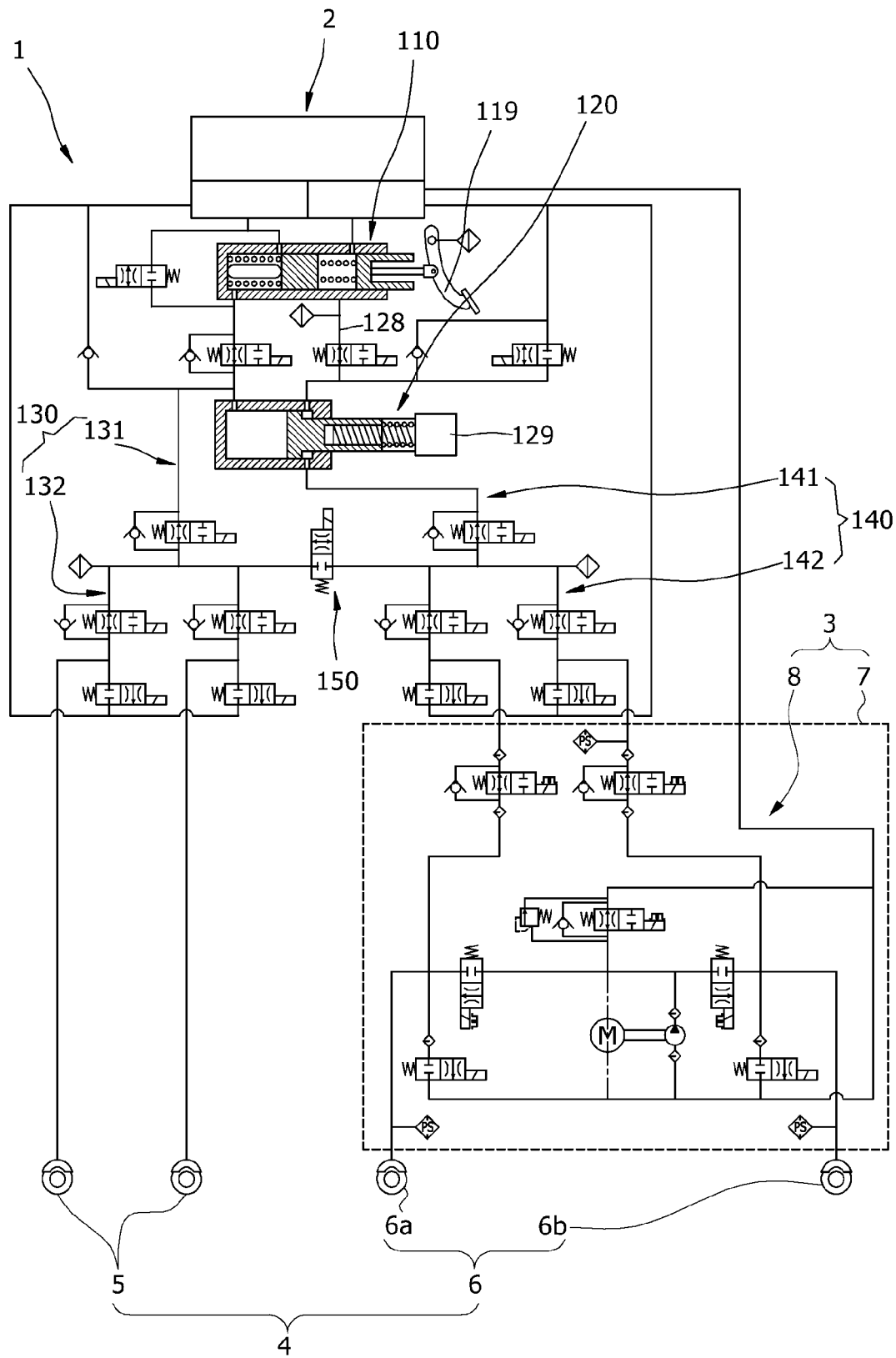
FIG. 2 is a view schematically illustrating the electro-hydraulic brake device according to the embodiment of the present disclosure.

FIG. 2 is a view schematically illustrating the electro-hydraulic brake device according to the embodiment of the present disclosure. Referring to FIG. 2, the main brake unit 1 according to the embodiment of the present disclosure includes a pedal cylinder unit 110, a master cylinder unit 120, a first main hydraulic unit 130, a second main hydraulic unit 140, and a third main hydraulic unit 150.

The pedal cylinder unit 110 generates a hydraulic pressure when a pedal 119 is stepped on. This pedal cylinder unit 110 may form two units of chambers and provide a pedal force corresponding to an increased pressure of the pedal 119.

The master cylinder unit 120 detects whether the pedal 119 is activated and generates a hydraulic pressure by driving a motor 129. The master cylinder unit 120 may form one chamber, and the motor 129 may be driven in a forward direction or a backward direction depending on a pressure increase state of the pedal 119. The master cylinder unit 120 may be connected to the pedal cylinder unit 110 through a cylinder line part 128.

The first main hydraulic unit 130 is connected to the master cylinder unit 120 and guides a flow of a braking fluid to some of the plurality of wheel cylinders 4.

More specifically, the first main hydraulic unit 130 may include a 1-1 hydraulic line part 131 which is connected to the master cylinder unit 120 and guides the braking fluid, and a 1-2 hydraulic line part 132 which is connected to and branches from the 1-1 hydraulic line part 131 and guides the braking fluid to a first the wheel cylinder 5. In this case, each of the two first wheel cylinders 5 may be arranged on a rear wheel.

The second main hydraulic unit 140 connects the auxiliary brake unit 3 with the master cylinder unit 120, and guides brake hydraulic pressure to the rest of the plurality of wheel cylinders 4.

More specifically, the second main hydraulic unit 140 may include a 2-1 hydraulic line part 141 which is connected to the master cylinder unit 120 and guides the brake hydraulic pressure, and a 2-2 hydraulic line part 142 which is connected to and branches from the 2-1 hydraulic line part 141 and guides the braking fluid the auxiliary brake unit 3. In this case, the auxiliary brake unit 3 may be connected to the second wheel cylinder 6, and each of the two second wheel cylinders 6 may be arranged on one of front wheels and may include a first wheel part 6a and a second wheel part 6b.

Meanwhile, the first wheel cylinder 5 may be arranged on the front wheel, the second wheel cylinder 6 may be arranged on the rear wheel, and by a vehicle drive type, the auxiliary brake unit 3 may be connected to a main drive wheel.

The third main hydraulic unit 150 connects or disconnects the second main hydraulic unit 140 to or from the first main hydraulic unit 130. As an example, the third main hydraulic unit 150 may connect the 2-2 hydraulic line part 142 with the 1-2 hydraulic line part 132.

Figure 3:
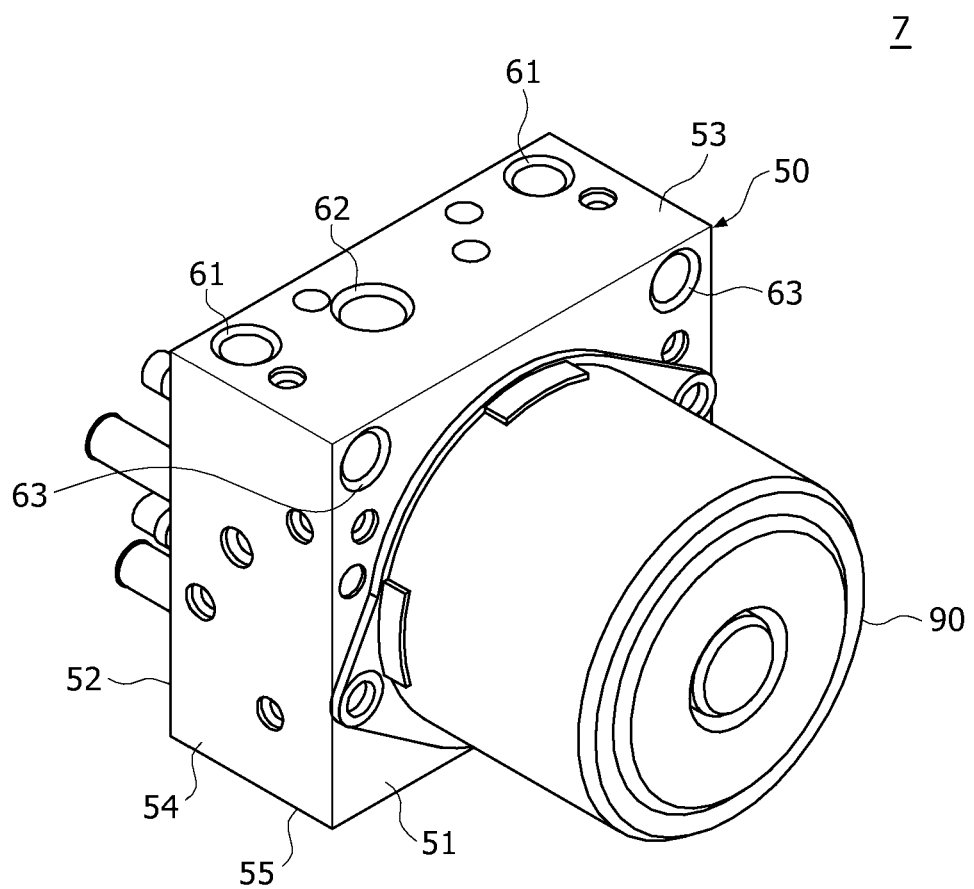
FIG. 3 is a perspective view schematically illustrating a block unit according to the embodiment of the present disclosure.
Figure 4:
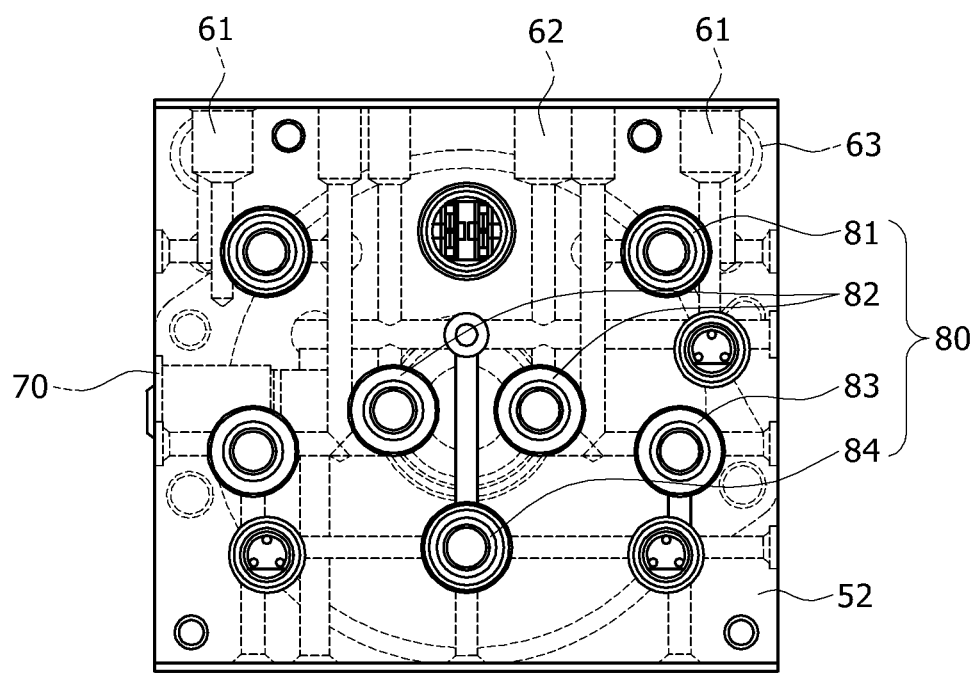
FIG. 4 is a rear view schematically illustrating the block unit according to the embodiment of the present disclosure.

FIG. 3 is a perspective view schematically illustrating the block unit according to the embodiment of the present disclosure, and FIG. 4 is a rear view schematically illustrating the block unit according to the embodiment of the present disclosure. Referring to FIGS. 3 and 4, the block unit 7 according to the embodiment of the present disclosure includes a block body unit 50, a main connection port 61, a storage connection port 62, a wheel connection port 63, a pump port unit 70, and a valve port unit 80.

The block body unit 50 is used to provide a braking force for a control system for anti-locking and driving dynamics. As an example, the block body unit 50 may be formed as a square block made of an aluminum alloy by extrusion molding and cutting processes. The block body unit 50 may include a front portion 51, a rear portion 52, an upper portion 53, side portions 54, and a lower portion 55.

The main connection port 61 is disposed at the upper portion 53 of the block body unit 50 and guides a connection of the main brake unit 1. As an example, the main connection port 61 is arranged on left and right edges of the upper portion 53 and may be arranged on the rear of a centerline across the upper portion 53 in a left-right length direction.

The storage connection port 62 is disposed at the upper portion 53 of the block body unit 50 and guides a connection of the storage unit 2. As an example, the storage connection port 62 is formed on the centerline across the upper portion 53 in the left-right length direction and may be arranged between the main connection port 61.

The wheel connection port 63 is disposed at the front portion 51 of the block body unit 50 and guides a connection of the wheel cylinder 4. As an example, the wheel connection port 63 may be disposed at left and right edges of an upper end of the front portion 51.

The pump port unit 70 is disposed at the side portion 54 of the block body unit 50 and guides movement of the braking fluid by the electric pump unit 90 that is driven when electric power is applied. As an example, a motor of the electric pump unit 90 is mounted on a center portion of the front portion 51, the pump port unit 70 is disposed at the side portion 54, and a pump of the electric pump unit 90 may be mounted thereon. Meanwhile, the pump port unit 70 may be disposed at any one of the side portions 54 when the motor-driven pump unit 90 is provided as one pump, the pump port unit 70 may be disposed at each of a pair of the side portions 54 when two pumps are provided, and the pump port unit 70 may be disposed at each of a pair of the side portions 54 and the lower portion 55 when three pumps are provided.

One or more of the valve port units 80 are disposed at the block body unit 50 and guide movement of the braking fluid by a valve unit that communicates with the hydraulic circuit unit 8 and controls a hydraulic pressure. As an example, the valve port unit 80 is disposed at the rear portion 52 of the block body unit 50, and a first valve port 81 to a fourth valve port 84 may be formed depending on the type of the valve unit. To ensure that the valve port units 80 are stably arranged, a port for introduction and discharge of the braking fluid may be omitted in the rear portion 52.

Figure 5:
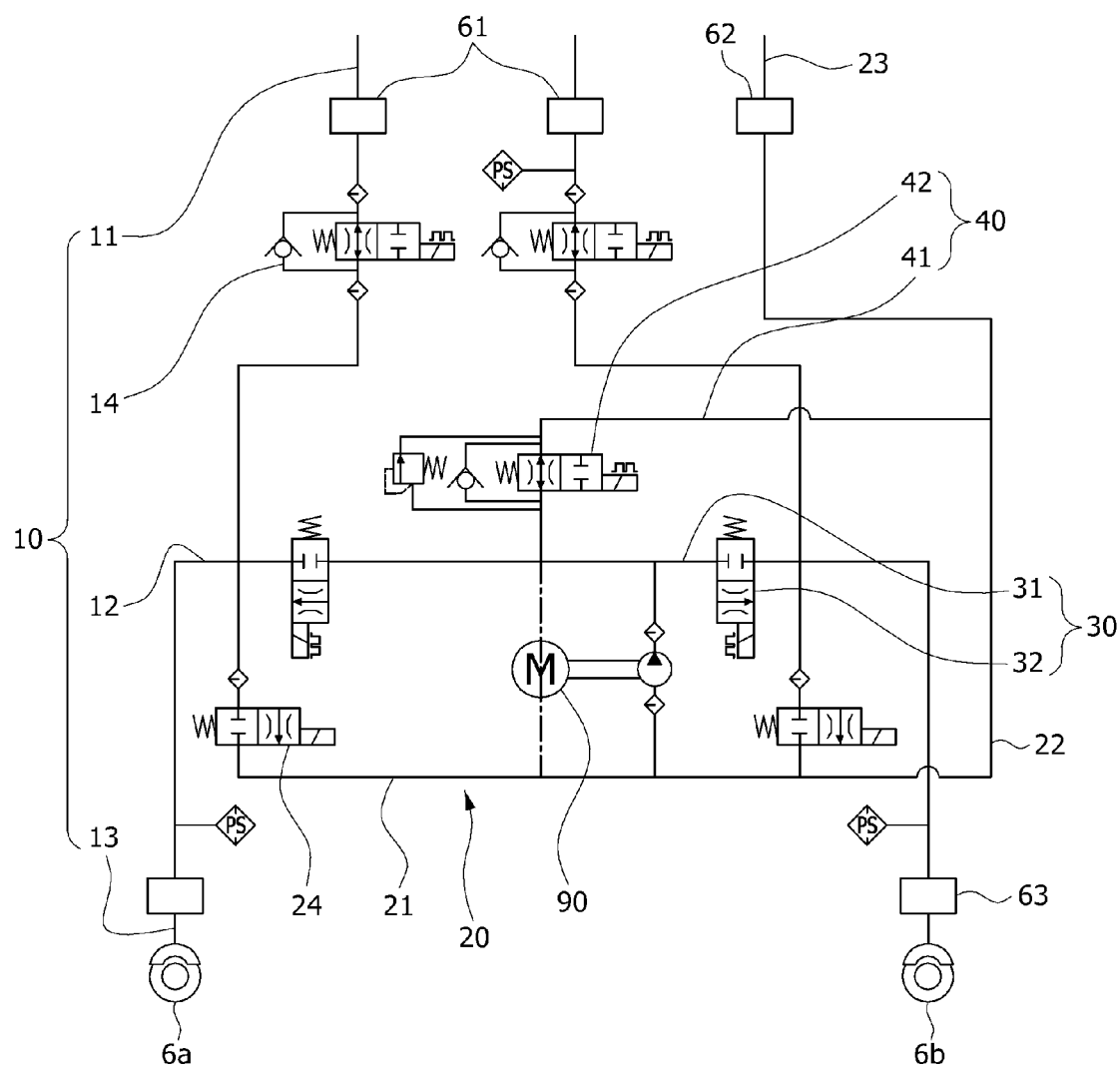
FIG. 5 is a view schematically illustrating a hydraulic circuit unit according to the embodiment of the present disclosure.

FIG. 5 is a view schematically illustrating the hydraulic circuit unit according to the embodiment of the present disclosure. Referring to FIGS. 2 to 5, the hydraulic circuit unit 8 according to the embodiment of the present disclosure includes a first auxiliary flow unit 10, a second auxiliary flow unit 20, and a third auxiliary flow unit 30.

The first auxiliary flow unit 10 connects the main brake unit 1 with the wheel cylinder 4, and controls a braking fluid. This first auxiliary flow unit 10 communicates with the first valve port 81. As an example, two first auxiliary flow units 10 may be connected to branched 2-2 hydraulic line parts 142. The first auxiliary flow unit 10 may pass or block a braking fluid and may control a set pressure of the braking fluid according to need.

The second auxiliary flow unit 20 connects the first auxiliary flow unit 10 with the electric pump unit 90 and controls a braking fluid. This second auxiliary flow unit 20 communicates with a second valve port 82. As an example, one end portion of the second auxiliary flow unit 20 may be connected to each part of the first auxiliary flow unit 10, and the other end portion thereof may be connected to the electric pump unit 90. The second auxiliary flow unit 20 may be connected to the storage unit 2. Meanwhile, the electric pump unit 90 is a device for forcibly supplying a braking fluid when electric power is applied and may supply the braking fluid when a failure of the main brake unit 1 occurs.

The third auxiliary flow unit 30 connects the electric pump unit 90 with the first auxiliary flow unit 10 and controls a braking fluid. This third auxiliary flow unit 30 communicates with a third valve port 83. As an example, the third auxiliary flow unit 30 is connected to the electric pump unit 90 and branched off, or connected to each electric pump unit 90 to guide a braking fluid discharged from the electric pump unit 90 to the first auxiliary flow unit 10.

More specifically, the first auxiliary flow unit 10 includes a 1-1 flow line 11, a 1-2 flow line 12, a 1-3 flow line 13, and a first flow valve 14.

The 1-1 flow line 11 connects the main brake unit 1 with the main connection port 61 and guides the braking fluid. As an example, the 1-1 flow line 11 may be connected, by one end portion, to each of the 2-2 hydraulic line parts 142 or may be replaced by the 2-2 hydraulic line part 142.

The 1-2 flow line 12 is disposed at the block body unit 50, connects the main connection port 61 with the wheel connection port 63, and communicates with the first valve port 81. As an example, the 1-2 flow line 12 is disposed at the block body unit 50 and may guide the braking fluid.

The 1-3 flow line 13 connects the wheel connection port 63 with the wheel cylinder 4 and guides a braking fluid. As an example, the 1-3 flow line 13 may be connected, by one end portion, to each of the wheel connection ports 63 and may be connected, by the other end portion, to the second wheel cylinder 6.

The first flow valve 14 is disposed at the 1-2 flow line 12 to open or close the 1-2 flow line 12. As an example, the first flow valve 14 may pass or block the braking fluid after inserted into the first valve port 81 and may control the set pressure of the braking fluid according to need. Meanwhile, the first flow valve 14 may be arranged in the 1-2 flow line 12 formed between the main connection port 61 and a connecting point of the 1-2 flow line 12, the second auxiliary flow unit 20, and the third auxiliary flow unit 30.

The second auxiliary flow unit 20 includes a 2-1 flow line 21 and a second flow valve 24.

A second flow line 21 is disposed at the block body unit 50 and guides a braking fluid after connecting the 1-2 flow line 12 with the pump port unit 70. In addition, the second flow valve 24 is formed in the 2-1 flow line 21 to open or close the 2-1 flow line 21.

As an example, the 2-1 flow line 21 may supply the braking fluid to the electric pump unit 90 after one end portion thereof is connected to a first flow line 11 and the other end portion thereof is connected to the pump port unit 70. In addition, the second flow valve 24 communicates with the 2-1 flow line 21 formed between the pump port unit 70 and the connecting point of the 1-2 flow line 12 and the 2-1 flow line 21, and may be arranged in the second valve port 82. A pair of the 2-1 flow lines 21 may be connected to each other, but may be connected to the electric pump unit 90 through a single line or separate lines.

The second auxiliary flow unit 20 may further include a 2-2 flow line 22 and a 2-3 flow line 23.

The 2-2 flow line 22 is disposed at the block body unit 50 and connects the storage connection port 62 with the 2-1 flow line 21. As an example, the 2-2 flow line 22 may be connected to the 2-1 flow line 21 formed between the second flow valve 24 and the pump port unit 70.

The 2-3 flow line 23 connects the storage unit 2 with the storage connection port 62. Accordingly, breathing quality can be improved because the braking fluid from the storage unit 2 is directly supplied to the electric pump unit 90 without passing through a separate valve.

The third auxiliary flow unit 30 includes a third flow line 31 and a third flow valve 32.

The third flow line 31 is disposed at the block body unit 50 and guides a braking fluid after connecting the 1-2 flow line 12 with the pump port unit 70. In addition, the third flow valve 32 is disposed at the third flow line 31 to open or close the third flow line 31.

As an example, a pair of the third flow lines 31 are connected to each other and guides the braking fluid to the 1-2 flow line 12, and thus the electric pump unit 90 may be used in common. This third flow line 31 may be connected to the electric pump unit 90 through a single line or separate lines. The third flow line 31, which is formed between the pump port unit 70 and a connecting point of the third flow line 31 and the 1-2 flow line 12, communicates with the third valve port 83, and the third flow valve 32 may be arranged in the third valve port 83.

Meanwhile, the third flow valve 32 opens the third flow line 31 so that the braking fluid discharged from the electric pump unit 90 is supplied to the wheel cylinder 4. At this time, the second flow valve 24 may close the 2-1 flow line 21.

The auxiliary brake unit 3 according to the embodiment of the present disclosure may further include a fourth auxiliary flow unit 40. The fourth auxiliary flow unit 40 controls a braking fluid after connecting the storage unit 2 with the third auxiliary flow unit 30, and communicates with the fourth valve port 84. As an example, the fourth auxiliary flow unit 40 may pass or block the braking fluid and may control a set pressure of the braking fluid according to need.

More specifically, the fourth auxiliary flow unit 40 includes a fourth flow line 41 and a fourth flow valve 42.

The fourth flow line 41 guides a braking fluid after connecting the storage unit 2 with the third auxiliary flow unit 30. In addition, the fourth flow valve 42 is disposed at the fourth flow line 41 to open or close the fourth flow line 41. The fourth flow valve 42 may pass or block the braking fluid and may control a set pressure of the braking fluid according to need.

As an example, one end portion of the fourth flow line 41 is connected to the third flow line 31, and the other end portion of the fourth flow line 41 may be directly connected to the storage unit 2 or may be connected to the 2-2 flow line 22 that is connected to the storage connection port 62. More specifically, the fourth flow line 41 is connected to the third flow line 31 formed between the electric pump unit 90 and the third flow valve 32.

Meanwhile, when the fourth flow line 41 is directly connected to the storage unit 2 or directly connected to the storage connection port 62, the 2-2 flow line 22 may be connected to the fourth flow line 41. In this case, the fourth flow line 41, which is formed between the third flow line 31 and a connecting point of the fourth flow line 41 and the 2-2 flow line 22, communicates with the fourth valve port 84, and the fourth flow valve 42 may be arranged in the fourth valve port unit 84.

Meanwhile, the first valve port unit 81 is arranged in one pair at left and right sides to be spaced apart from each other above a line where the pump port unit 70 is arranged. In addition, the second valve port 82 is arranged in one pair to be close to each other on the line where the pump port unit 70 is arranged. Also, the third valve port 83 is arranged in one pair at left and right sides to be spaced apart from each other below the line where the pump port unit 70 is arranged. Finally, the fourth valve port unit 84 is arranged on a longitudinal center line of the block body unit 50 and formed below the third valve port 83.

Figure 6:
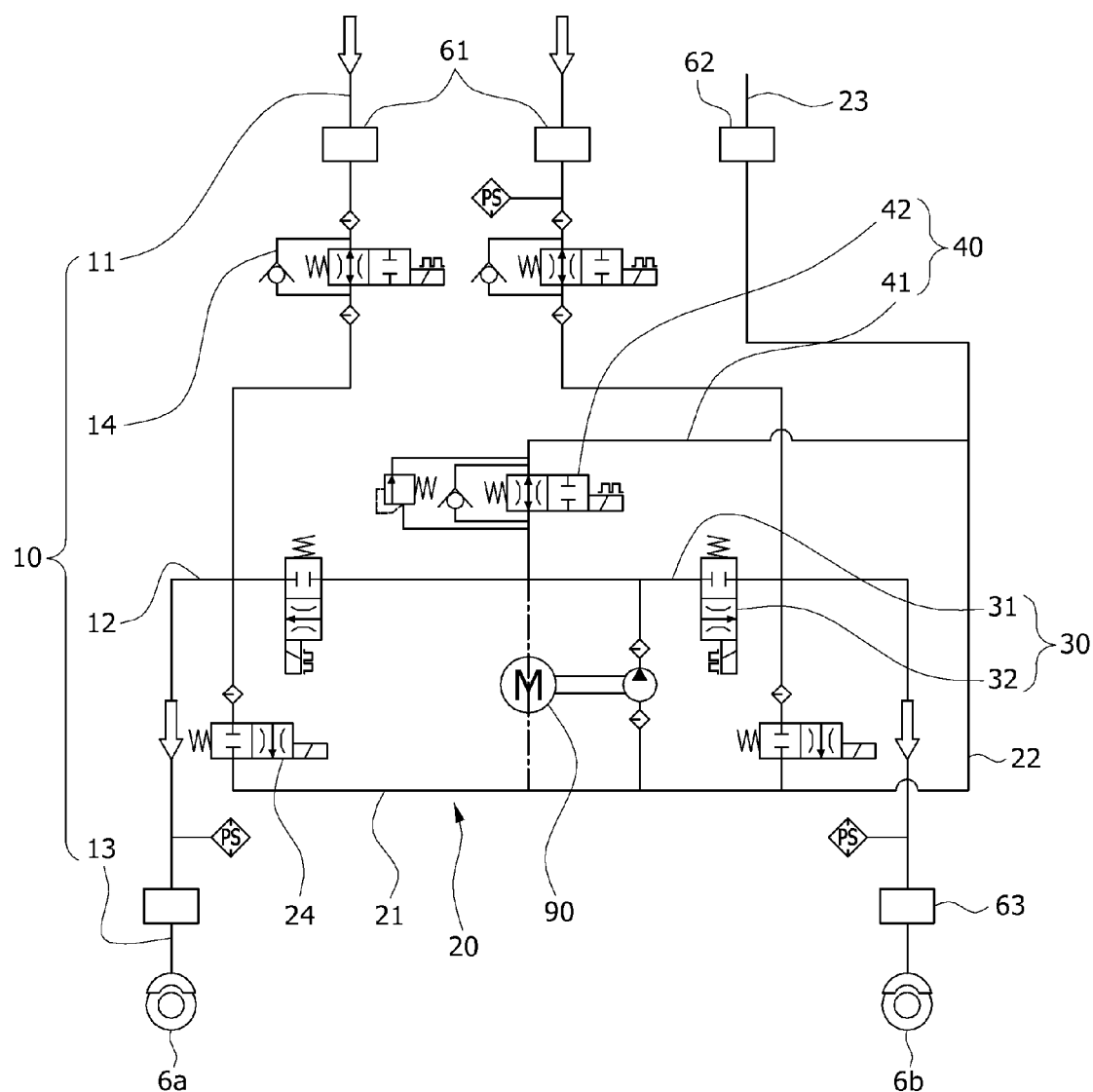
FIG. 6 is a view schematically illustrating a normal operation state of a main brake unit in the electro-hydraulic brake device according to the embodiment of the present disclosure.

FIG. 6 is a view schematically illustrating a normal operation state of the main brake unit in the electro-hydraulic brake device according to the embodiment of the present disclosure. Referring to FIG. 6, in a normal state of the main brake unit 1, when the pedal 119 is stepped on or braking is required by an autonomous driving system, the motor 129 of the master cylinder unit 120 is driven. That way, a hydraulic pressure generated from the master cylinder unit 120 is then increased to provide the braking fluid to the first main hydraulic unit 130 and the second main hydraulic unit 140.

The braking fluid passing through the first main hydraulic unit 130 is supplied to the first wheel cylinder 5. Thus, rear-wheel braking is performed. In addition, the braking fluid passing through the second main hydraulic unit 140 passes through the auxiliary brake unit 3 and is supplied to the second wheel cylinder 6. Thus, front-wheel braking is performed.

In the auxiliary brake unit 3, the first flow valve 14 opens the 1-2 flow line 12, the second flow valve 24 blocks the 2-1 flow line 21, and the third flow valve 32 blocks the third flow line 31. At this time, the fourth flow valve 42 may open the fourth flow line 41.

Figure 7:
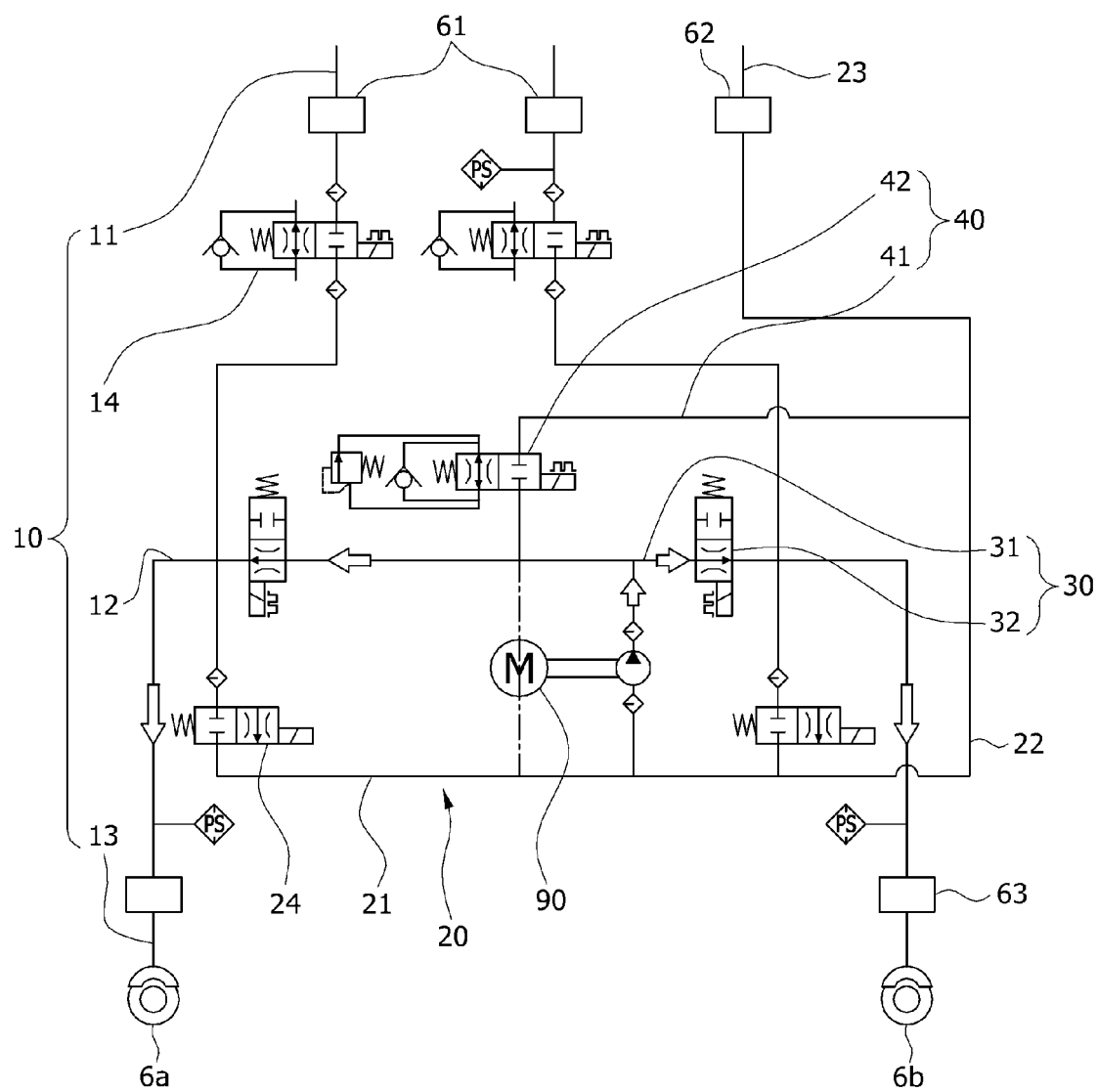
FIG. 7 is a view schematically illustrating a two-wheel pressure increase state of an auxiliary brake unit provided with the electric pump unit according to a first embodiment of the present disclosure.

FIG. 7 is a view schematically illustrating a two-wheel pressure increase state of the auxiliary brake unit provided with the electric pump unit according to a first embodiment of the present disclosure. Referring to FIG. 7, in an abnormal operating state of the main brake unit 1, the first flow valve 14 blocks the 1-2 flow line 12, the second flow valve 24 blocks the 2-1 flow line 21, and the third flow valve 32 opens the third flow line 31. In addition, the fourth flow valve 42 may block the fourth flow line 41 or control the set pressure.

In a state described above, when one pump provided in the electric pump unit 90 is driven, a braking fluid discharged from the electric pump unit 90 is branched off through the third flow line 31 and supplied to the second wheel cylinder 6. Thus, the front-wheel braking is performed. In this case, a braking fluid in the storage unit 2 may be supplied to the electric pump unit 90 through the 2-2 flow line 22 without passing through a valve.

Figure 8:
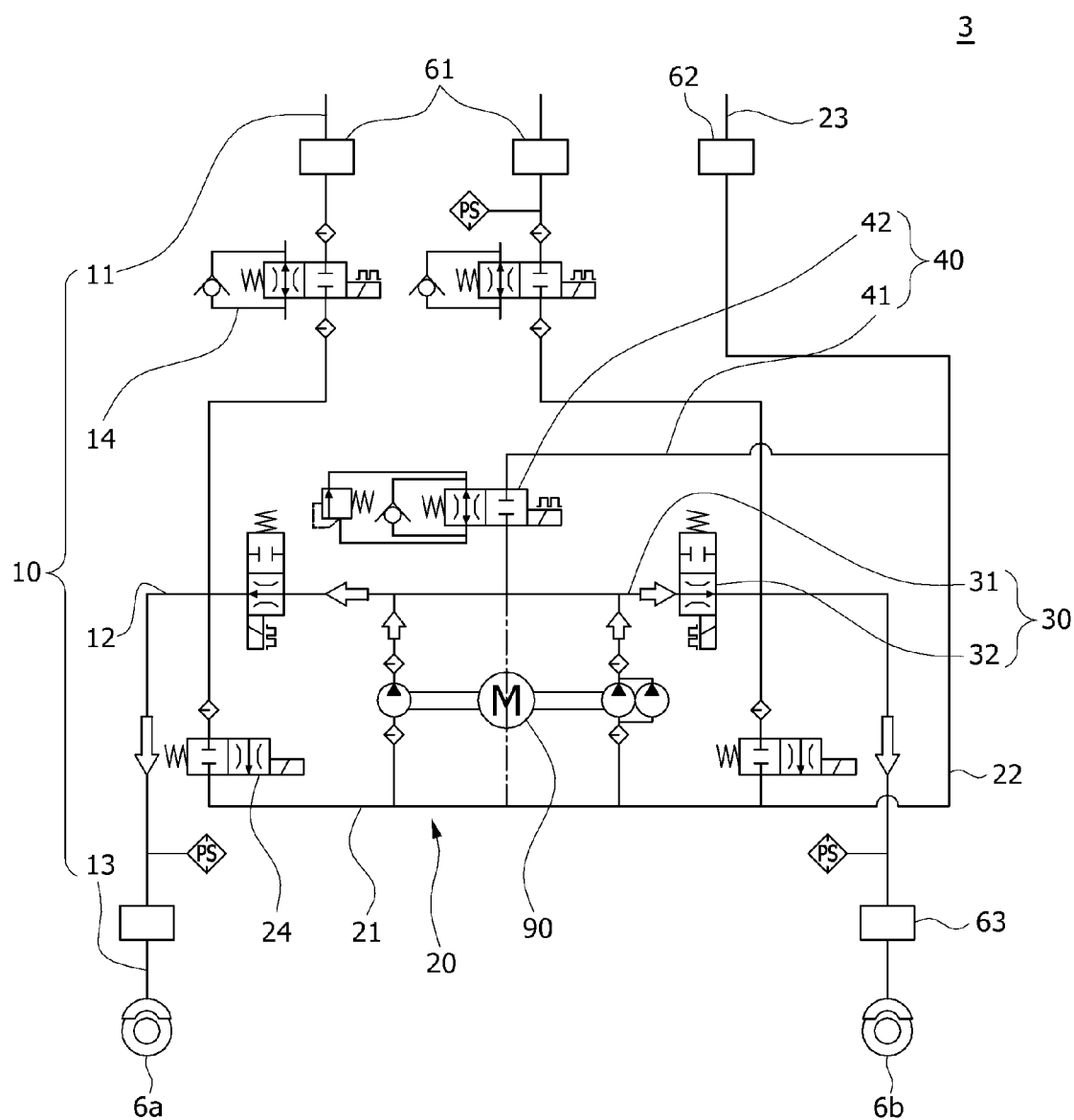
FIG. 8 is a view schematically illustrating a two-wheel pressure increase state of the auxiliary brake unit provided with the electric pump unit according to a second embodiment of the present disclosure.

FIG. 8 is a view schematically illustrating a two-wheel pressure increase state of the auxiliary brake unit provided with the electric pump unit according to a second embodiment of the present disclosure. Referring to FIG. 8, in an abnormal operating state of the main brake unit 1, the first flow valve 14 blocks the 1-2 flow line 12, the second flow valve 24 blocks the 2-1 flow line 21, and the third flow valve 32 opens the third flow line 31. In addition, the fourth flow valve 42 may block the fourth flow line 41 or control the set pressure.

In a state described above, when three pumps provided in the electric pump unit 90 are driven, braking fluids discharged individually from the electric pump unit 90 are supplied through the third flow line 31 to each of the second wheel cylinders 6. Thus, front-wheel braking is performed. In this case, the braking fluid stored in the storage unit 2 through a flow path connection port 23 may be supplied to the electric pump unit 90.

Figure 9:
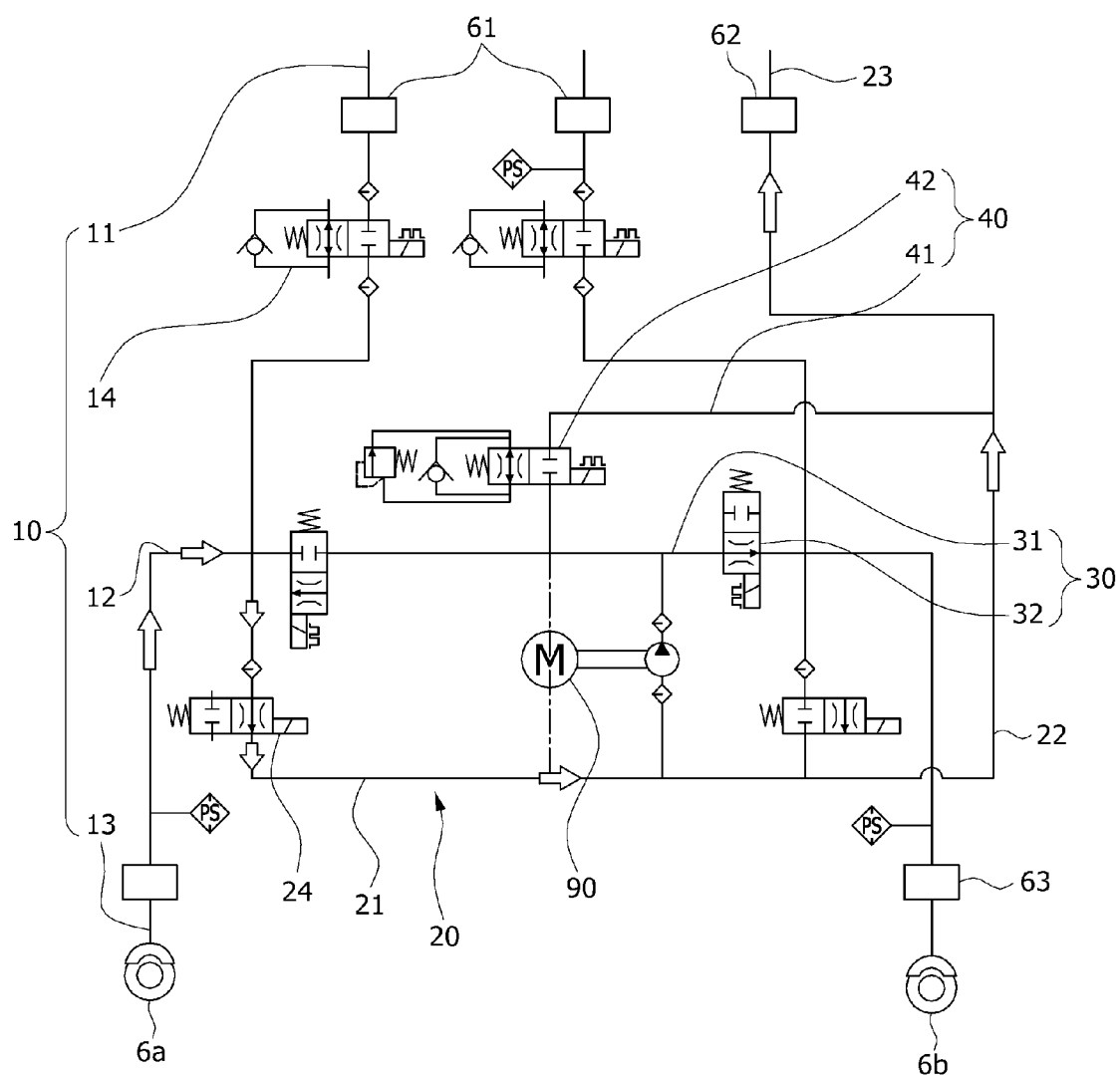
FIG. 9 is a view schematically illustrating a one-wheel decompression state of the auxiliary brake unit according to the embodiment of the present disclosure.

FIG. 9 is a view schematically illustrating a one-wheel decompression state of the auxiliary brake unit according to the embodiment of the present disclosure, and may be the one-wheel decompression state of anti-lock braking system (ABS). Referring to FIG. 9, in an abnormal operating state of the main brake unit 1, the first flow valve 14 blocks the 1-2 flow line 12. In addition, the second flow valve 24, which is disposed at the 2-1 flow line 21 related to the first wheel part 6a that is a decompression target, opens the 2-1 flow line 21. On the other hand, the second flow valve 24, which is disposed at the 2-1 flow line 21 related to the second wheel part 6b that is not the decompression target, blocks the 2-1 flow line 21.

At this time, the third flow valve 32, which is disposed at the third flow line 31 related to the first wheel part 6a that is the decompression target, blocks the third flow line 31. On the other hand, the third flow valve 32, which is disposed at the third flow line related to the second wheel part 6b that is not a decompression target, opens the third flow line 31. Meanwhile, the fourth flow valve 42 may block the fourth flow line 41 or control the set pressure.

In the state described above, the braking fluid supplied to the first wheel part 6a that is the decompression target, moves sequentially through the 1-2 flow line 12, the 2-1 flow line 21, and the 2-2 flow line 22 to the storage unit 2. Thus, one-wheel decompression is performed.

Figure 10:
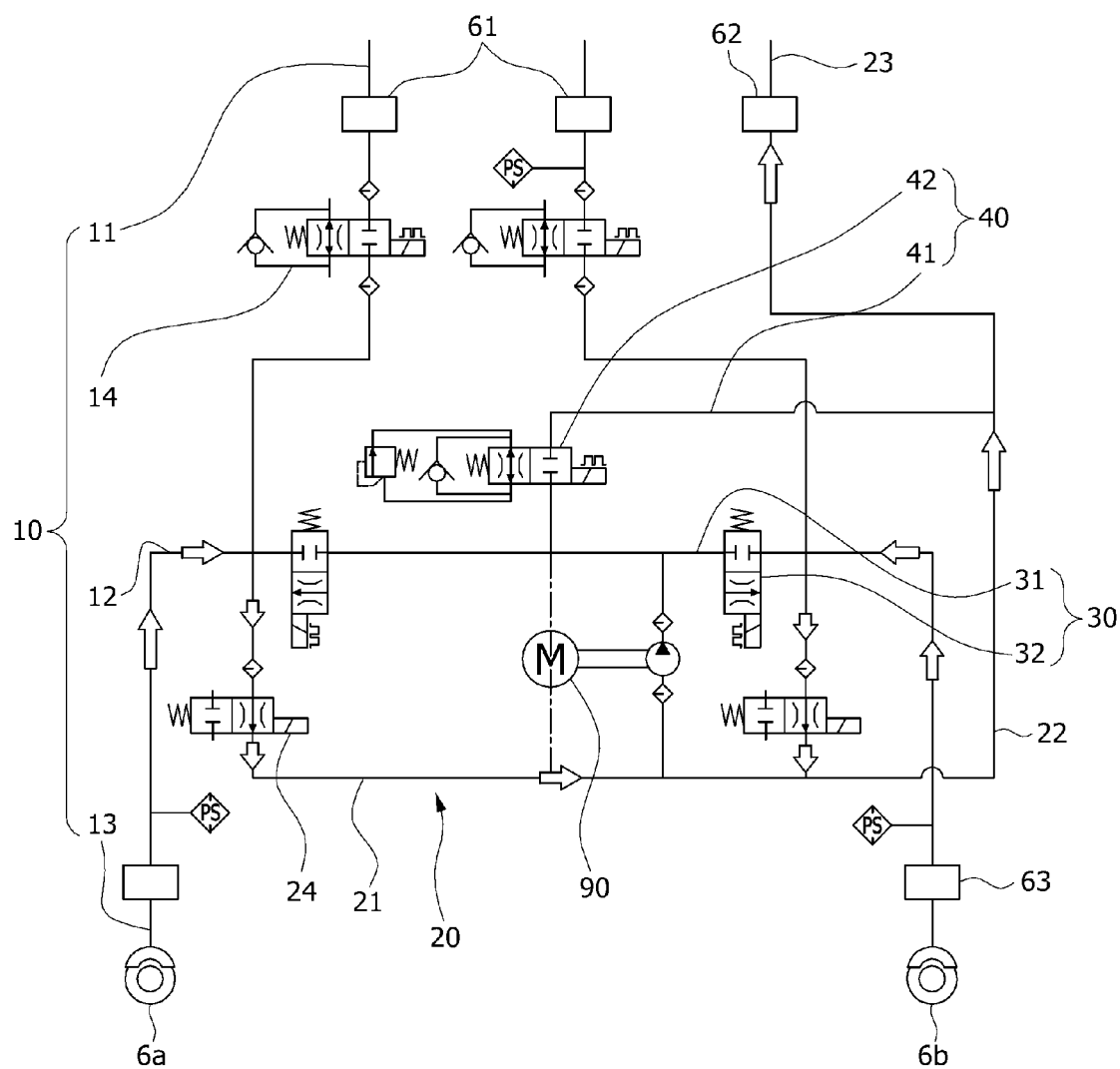
FIG. 10 is a view schematically illustrating a two-wheel decompression state of the auxiliary brake unit according to the embodiment of the present disclosure.

FIG. 10 is a view schematically illustrating a two-wheel decompression state of the auxiliary brake unit according to the embodiment of the present disclosure, and may be the two-wheel decompression state of ABS. Referring to FIG. 10, in an abnormal operating state of the main brake unit 1, the first flow valve 14 blocks the 1-1 flow line 12, and the second flow valve 24 opens the 2-1 flow line 21. At this time, the third flow valve 32, which is disposed at the third flow line 31 related to the second wheel cylinder 6 that is the decompression target, blocks the third flow line 31. Meanwhile, the fourth flow valve 42 may block the fourth flow line 41 or control the set pressure.

In the state described above, operation of the electric pump unit 90 is stopped, and the braking fluid supplied to the second wheel cylinder 6 that is the decompression target, moves sequentially through the 1-2 flow line 12, the 2-1 flow line 21, and the 2-2 flow line 22 to the storage unit 2. Thus, two-wheel decompression is performed.

Figure 11:
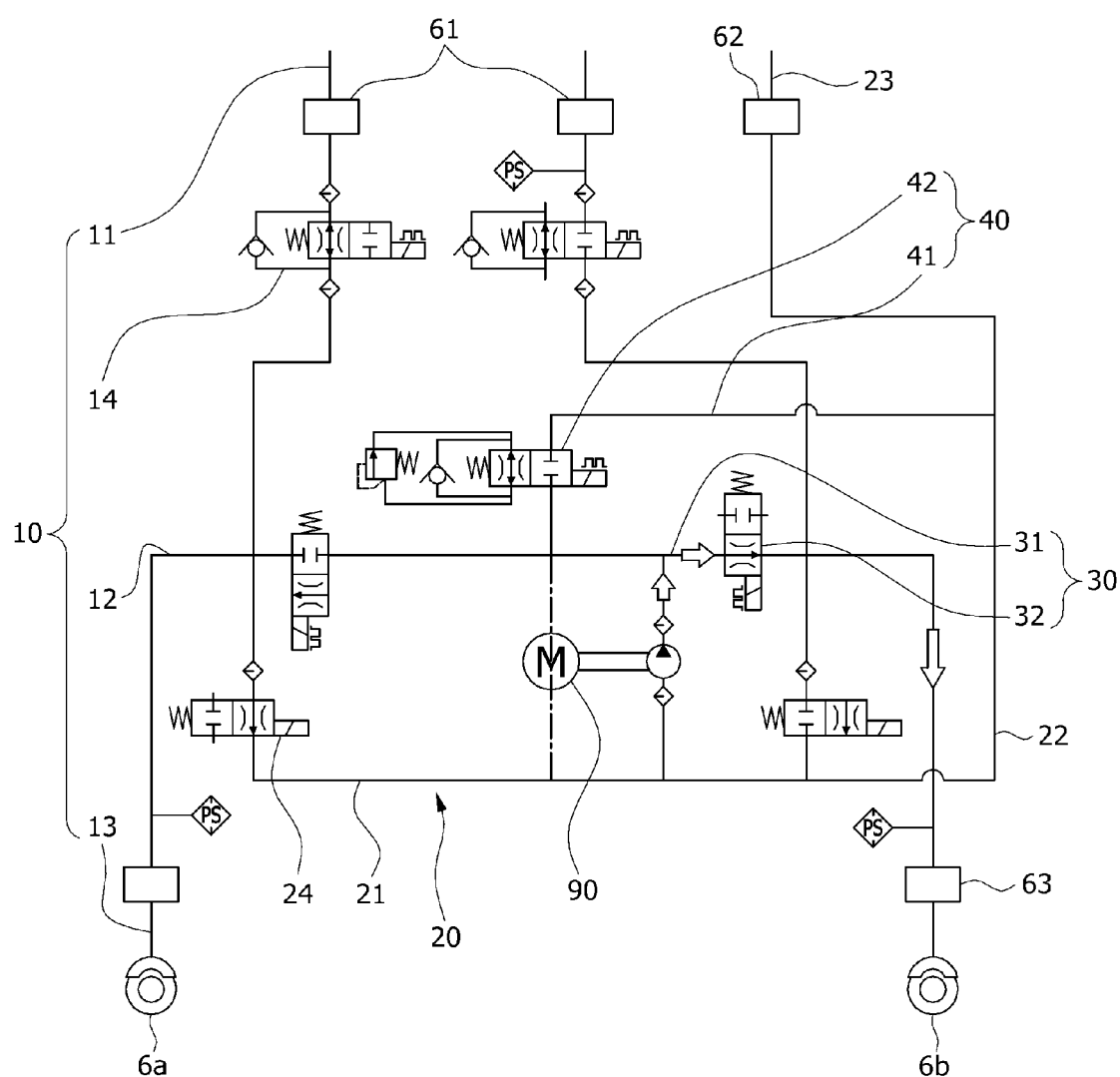
FIG. 11 is a view schematically illustrating a one-wheel pressure increase state of the auxiliary brake unit according to the embodiment of the present disclosure.

FIG. 11 is a view schematically illustrating a one-wheel pressure increase state of the auxiliary brake unit according to the embodiment of the present disclosure, and may be the one-wheel pressure increase state of vehicle dynamics control (VDC). Referring to FIG. 11, the first flow valve 14, which is disposed at the 1-2 flow line 12 connected to the second wheel part 6b that is the pressure increase target, blocks the 1-2 flow line 12. On the other hand, the first flow valve 14, which is disposed at the 1-2 flow line 12 connected to the first wheel part 6a that is not the pressure increase target, opens the 1-2 flow line 12.

In addition, the second flow valve 24, which is disposed at the 2-1 flow line 21 related to the second wheel part 6b that is the pressure increase target, blocks the 2-1 flow line 21. On the other hand, the second flow valve 24, which is disposed at the 2-1 flow line 21 related to the first wheel part 6a that is not the pressure increase target, opens the 2-1 flow line 21.

At this time, the third flow valve 32, which is disposed at the third flow line 31 related to the second wheel part 6b that is the pressure increase target, opens the third flow line 31. On the other hand, the third flow valve 32, which is disposed at the third flow line 31 related to the first wheel part 6a that is not the pressure increase target, blocks the third flow line 31. Meanwhile, the fourth flow valve 42 may block the fourth flow line 41 or control the set pressure.

In a state described above, when the electric pump unit 90 is driven, the braking fluid discharged from the electric pump unit 90 is supplied to the second wheel part 6b that is the pressure increase target, through the third flow line 31. Thus, braking is performed.

Figure 12:
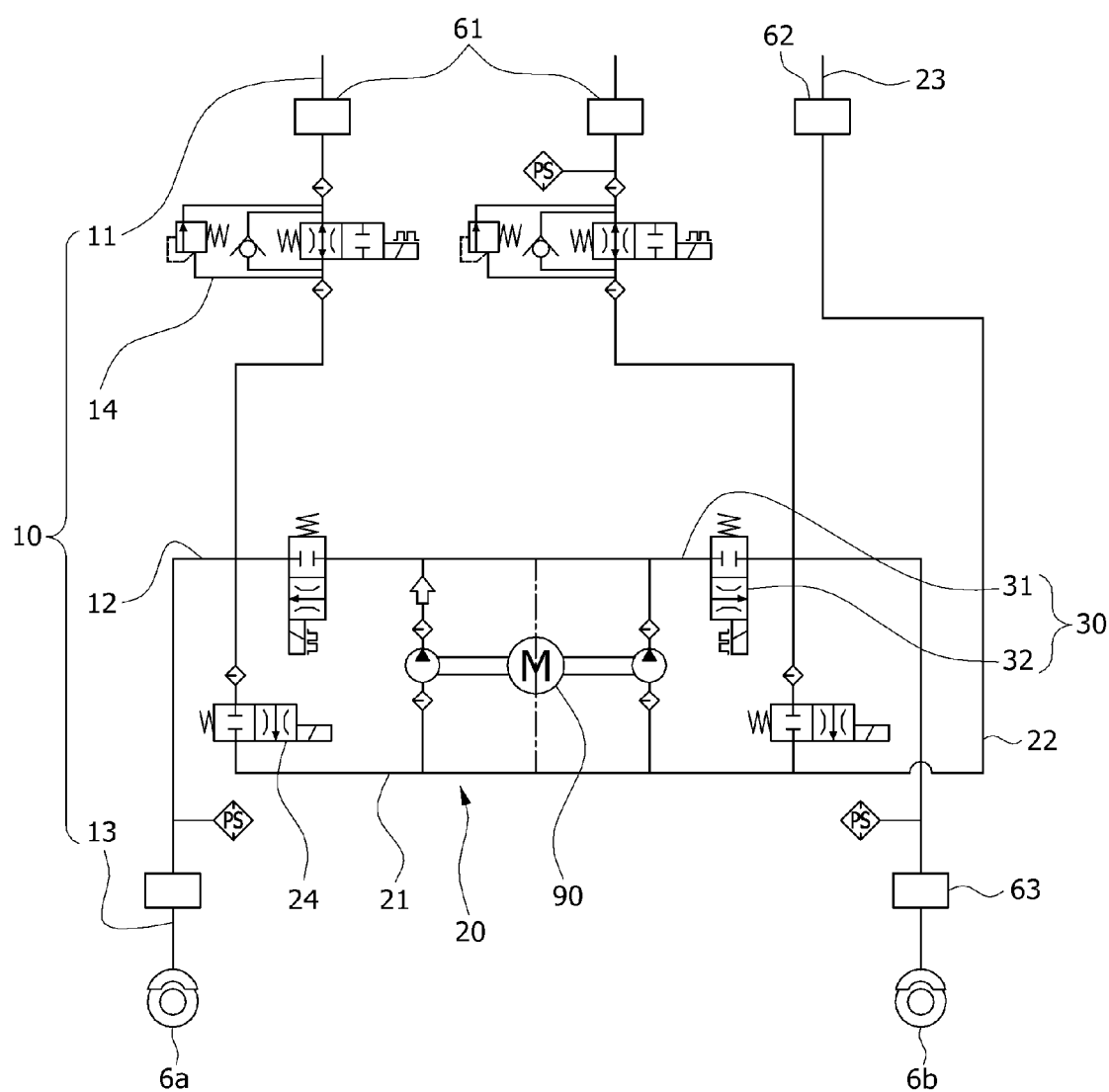
FIG. 12 is a view schematically illustrating a hydraulic control state of the auxiliary brake unit according to the first embodiment of the present disclosure.

FIG. 12 is a view schematically illustrating a hydraulic control state of the auxiliary brake unit according to the first embodiment of the present disclosure. Since the pedal 119 is removed or an electric pedal is used, disturbance of control in the auxiliary brake unit 3 does not occur even when a driver intervenes. Referring to FIG. 12, the first flow valve 14 may control a set pressure of the braking fluid. In this case, the fourth auxiliary flow unit 40 may be omitted from the hydraulic circuit.

Figure 13:
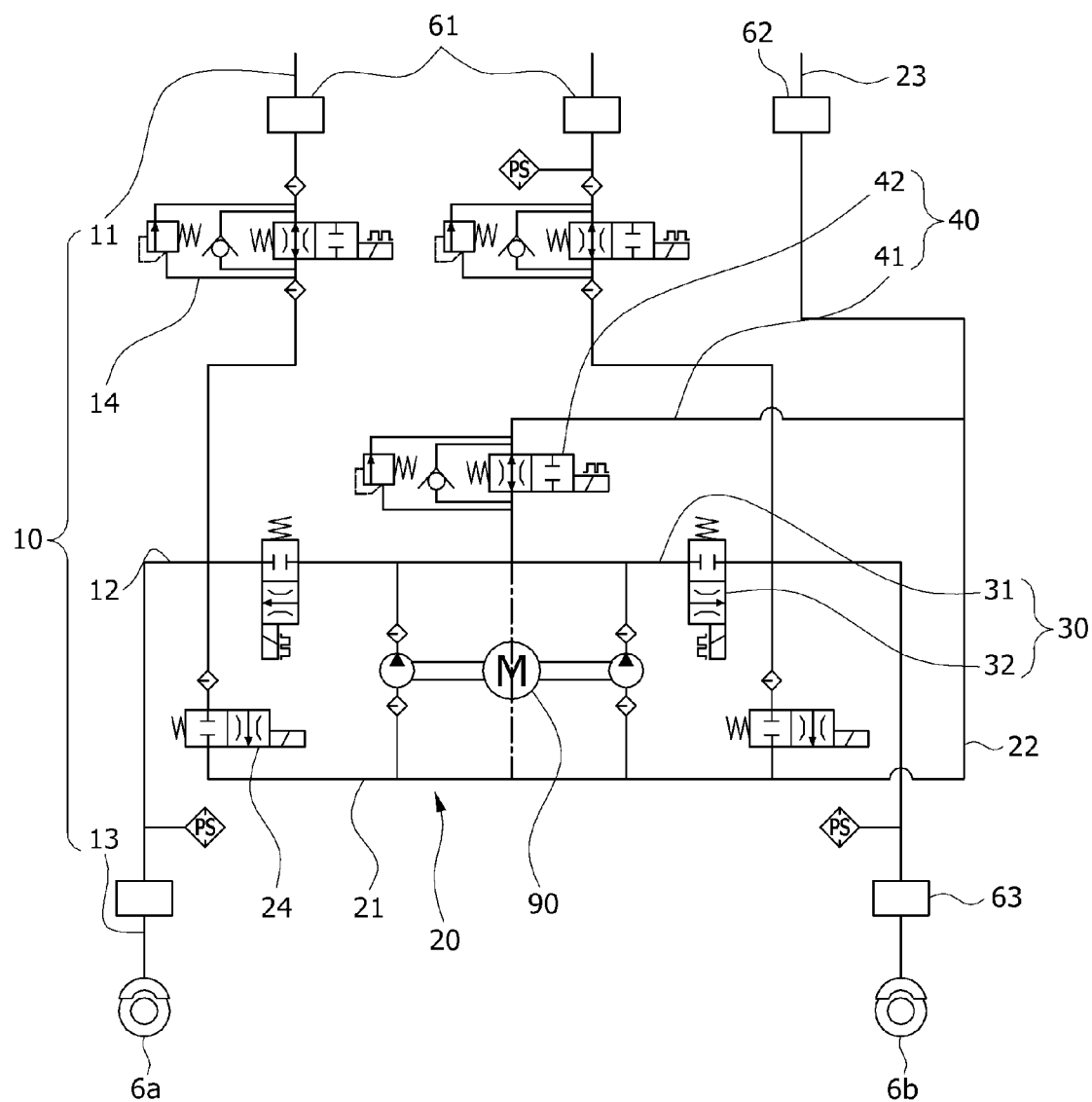
FIG. 13 is a view schematically illustrating a hydraulic control state of the auxiliary brake unit according to the second embodiment of the present disclosure.
Figure 14:
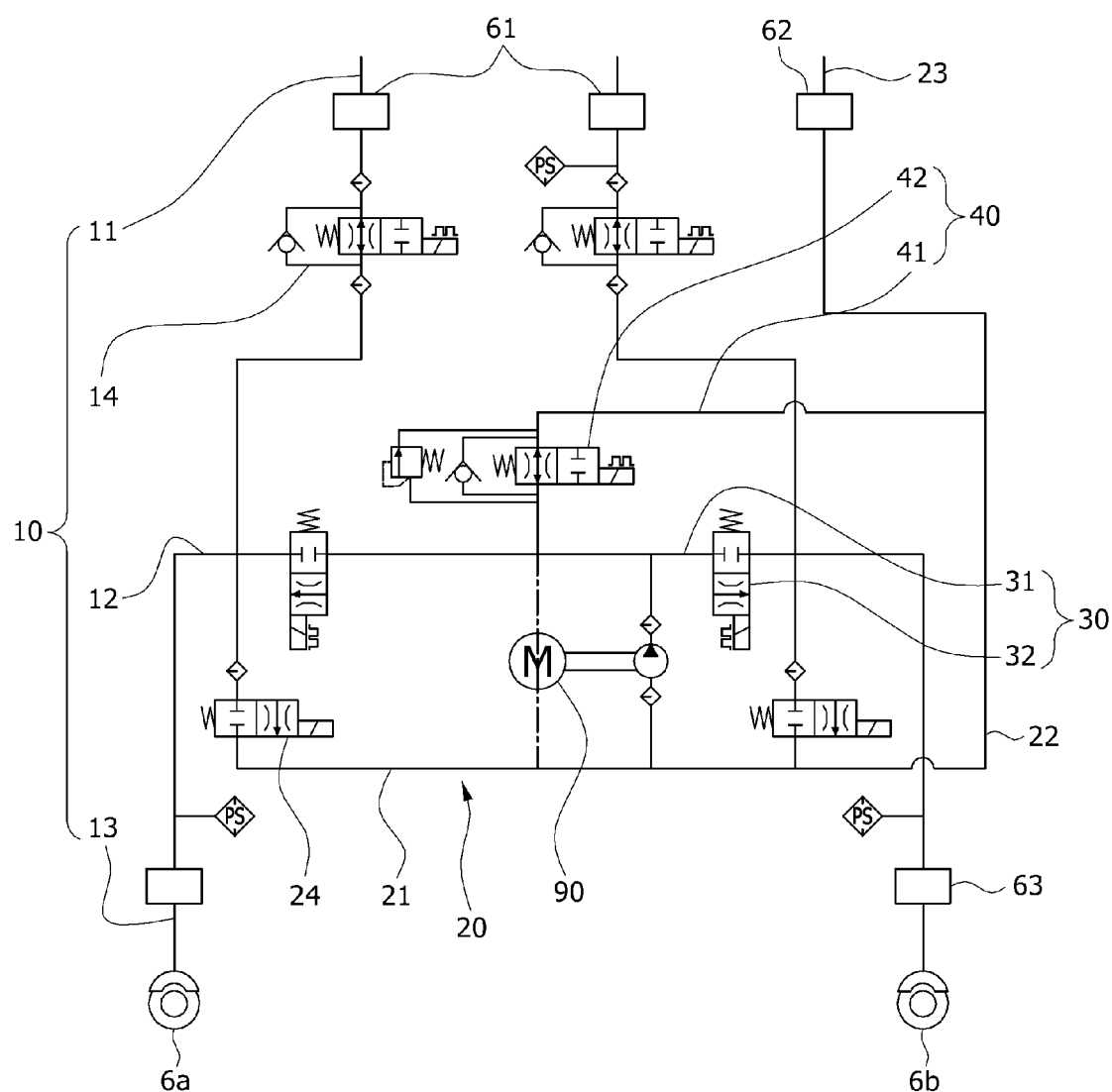
FIG. 14 is a view schematically illustrating a hydraulic control state of the auxiliary brake unit according to a third embodiment of the present disclosure.

FIG. 13 is a view schematically illustrating a hydraulic control state of the auxiliary brake unit according to the second embodiment of the present disclosure, and FIG. 14 is a view schematically illustrating a hydraulic control state of an auxiliary brake unit according to the third embodiment of the present disclosure. FIG. 14 shows the hydraulic circuit to minimize the disturbance of control in the auxiliary brake unit 3 when a driver intervenes and steps on the pedal 119. Referring to FIG. 13, the first flow valve 14 may control the set pressure of the braking fluid, and the fourth flow valve 42 may control a set pressure of the braking fluid. Meanwhile, referring to FIG. 14, the first flow valve 14 may control on-off only of the 1-2 flow line 12, and the fourth flow valve 42 only may control the set pressure of the braking fluid.

Figure 15:
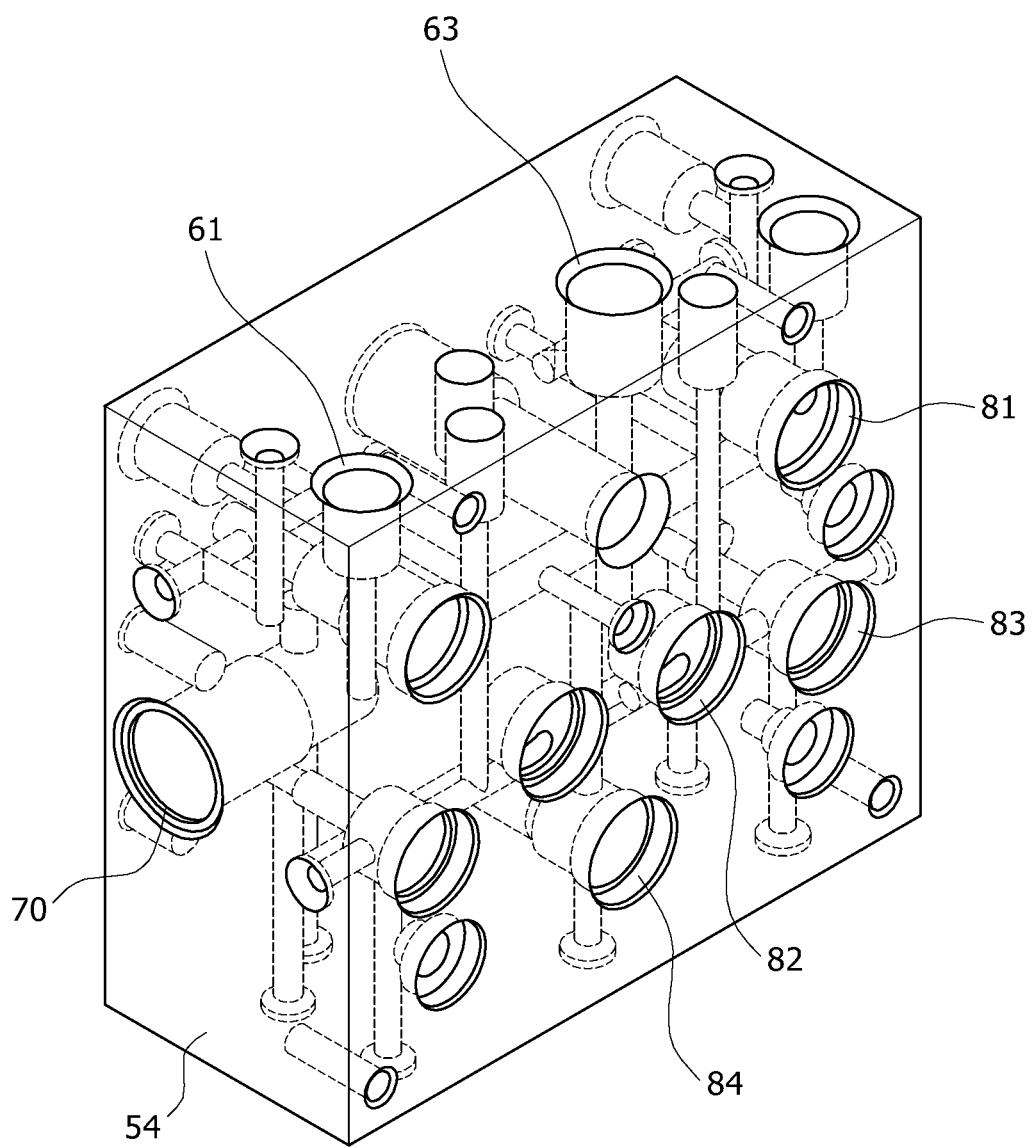
FIG. 15 is a perspective view schematically illustrating a state of the hydraulic circuit unit disposed at the block unit according to the embodiment of the present disclosure.
Figure 16:
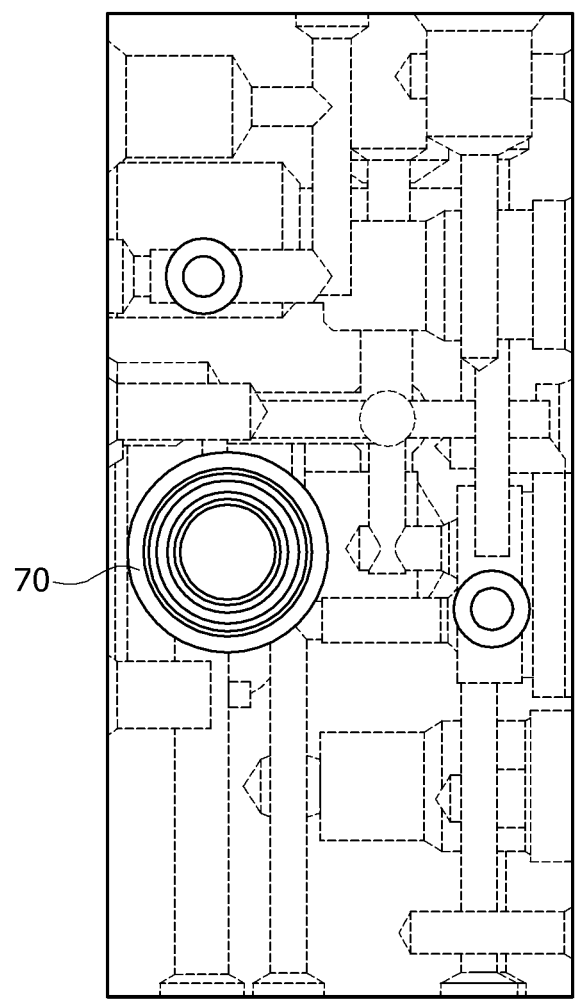
FIG. 16 is a view schematically illustrating a side surface of a block body unit in which a pump port unit according to the embodiment of the present disclosure is formed.
Figure 17:
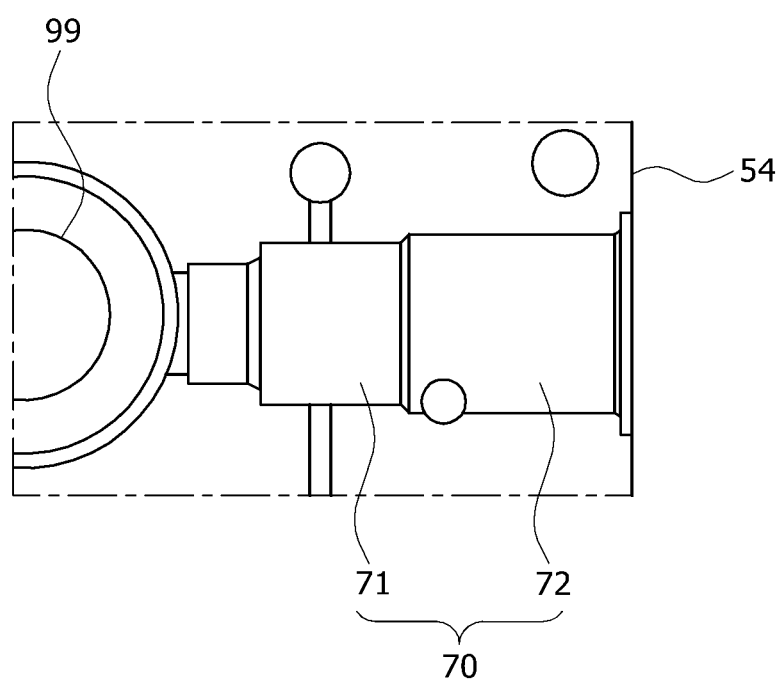
FIG. 17 is a view schematically illustrating the pump port unit disposed at the block body unit according to the embodiment of the present disclosure.

FIG. 15 is a perspective view schematically illustrating a state of the hydraulic circuit unit disposed at the block unit, FIG. 16 is a view schematically illustrating a side surface of the block body unit in which the pump port unit according to the embodiment of the present disclosure is formed, and FIG. 17 is a view schematically illustrating the pump port unit disposed at the block body unit according to the embodiment of the present disclosure. Referring to FIGS. 15 to 17, an inlet part 71 of the pump port unit 70 is connected to the electric pump unit 90, and an outlet part 72 of the pump port unit 70 is disposed at the side portion 54 of the block body unit 50.

As an example, the inlet part 71 of the pump port unit 70 may communicate with (or in communication with) a pump mounting part 99 on which the electric pump unit 90 is mounted, and the outlet part 72 of the pump port unit 70 may be exposed to the outside through the side portion 54. The outlet part 72 extends straightly from the inlet part 71.

Figure 18:
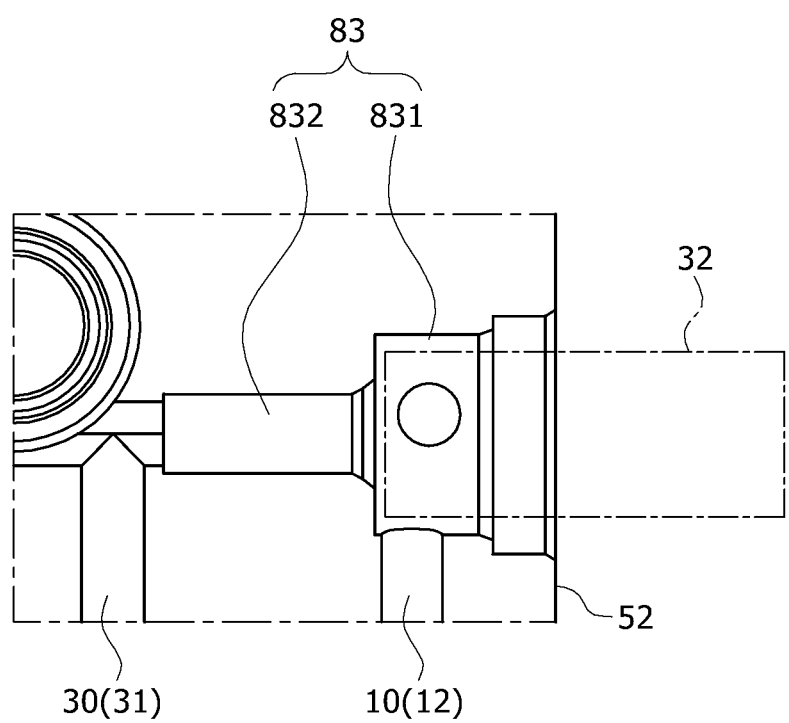
FIG. 18 is a view schematically illustrating the third valve port according to the embodiment of the present disclosure.

FIG. 18 is a view schematically illustrating the third valve port according to the embodiment of the present disclosure. Referring to FIG. 15 to 18, an inlet part 831 of the third valve port 83 is disposed at the rear portion 52 of the block body unit 50 and connected to the first auxiliary flow unit 10, and an outlet part 832 of the third valve port 83 is connected to the third auxiliary flow unit 30.

As an example, the inlet part 831 of the third valve port 83 is exposed on the rear portion 52 and may form a space for mounting the third flow valve 32, and the 1-2 flow line 12 may be connected to a side surface of the inlet part 831. The third flow valve 32 uses a normally closed type valve to apply a valve spring force in a closing direction, and the braking fluid, in normal braking, may provide a supporting force with a pressure disposed at the inlet part 831 of the third valve port 83 to the third flow valve 32 at which a line is closed. Due to this, leakage can be prevented by the characteristics of the valve mechanism design when the third flow valve 32 is connected to the 1-2 flow line 12 that is normally closed. Meanwhile, the inlet part 831 of the third valve port 83 may be connected to the outlet part 72 of the pump port unit 70.

Figure 19:
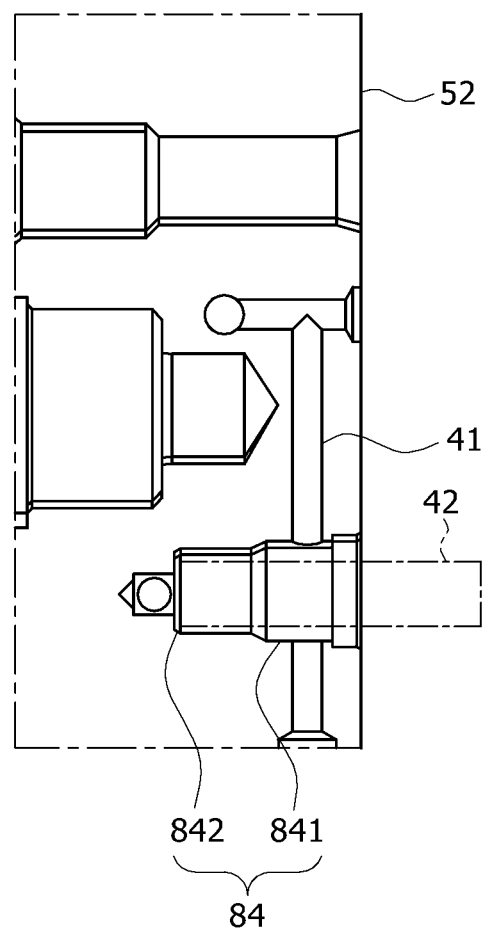
FIG. 19 is a view schematically illustrating the fourth valve port unit according to the embodiment of the present disclosure.

FIG. 19 is a view schematically illustrating the fourth valve port unit according to the embodiment of the present disclosure. Referring to FIG. 19, the inlet part 841 of the fourth valve port unit 84 is disposed at the rear portion 52 of the block body unit 51 and connected to the storage unit 2, and the outlet part 842 of the fourth valve port unit 84 is connected to the third auxiliary flow unit 30.

As an example, the inlet part 841 of the fourth valve port unit 84 is exposed on the rear portion 52 and may form a space for the mounting of the fourth flow valve 42, and the fourth flow line 41 connected to a side surface of the inlet part 841 may be connected to the 2-2 flow line 22. In addition, the outlet part 842 of the fourth valve port unit 84 may be connected to the outlet part 72 of the pump port unit 70. Meanwhile, the fourth flow valve 42 adopts a normally open type valve and may control a set pressure of a hydraulic line increased by the electric pump unit 90.

In the electro-hydraulic brake device according to the embodiment of the present disclosure, the main brake unit 1 and the auxiliary brake unit 3 are connected to each other through the hydraulic circuit, and when an operational failure of the main brake unit 1 occurs, the auxiliary brake unit 3 can be activated to perform braking.

In the electro-hydraulic brake device according to the embodiment of the present disclosure, the first auxiliary flow unit 10 connects the wheel cylinder 4 with the main brake unit 1 to control a flow of a braking fluid, the second auxiliary flow unit 20 connects the electric pump unit 90 with the first auxiliary flow unit 10 to control the flow of the braking fluid, and the third auxiliary flow unit 30 connects the first auxiliary flow unit 10 with the electric pump unit 90 to control the braking fluid. Therefore, the hydraulic circuit can be physically divided by a function.

In the electro-hydraulic brake device according to the embodiment of the present disclosure, the second auxiliary flow unit 20 is connected to the storage unit 2, and the valve resistance to the braking fluid supplied to the electric pump unit 90 is removed. Therefore, breathing quality can be improved.

The present disclosure has been described with reference to exemplary embodiments illustrated in the drawings, but this is only for exemplary purposes, and those skilled in the art will appreciate that various modifications and other equivalent exemplary embodiments are possible.

Thus, the true technical scope of the disclosure should be defined by the following claims.

What is claimed is:

1. An electro-hydraulic brake device comprising:
a main brake unit configured to provide a braking fluid to a plurality of wheel cylinders of a vehicle;
a storage unit connected to the main brake unit and configured to store the braking fluid; and
an auxiliary brake unit configured to provide the braking fluid to one or more of the wheel cylinders when an operational failure occurs to the main brake unit, and including a block unit and a hydraulic circuit unit disposed in the block unit,
wherein a hydraulic line of the hydraulic circuit unit is physically divided into a plurality of auxiliary flow units based on function, and the hydraulic circuit unit is connected to the main brake unit and the storage unit,
wherein the block unit comprises:
a block body unit;
a main connection port disposed at an upper portion of the block body unit and configured to guide a connection of the main brake unit;
a storage connection port disposed at the upper portion of the block body unit and configured to guide a connection of the storage unit;
a wheel connection port disposed at a front portion of the block body unit and configured to guide a connection of the wheel cylinder;
a pump port unit disposed at a side portion of the block body unit and configured to guide a flow of the braking fluid by an electric pump unit; and
one or more valve ports disposed at the block body unit and configured to guide the flow of the braking fluid by a valve unit in communication with the hydraulic circuit unit,
wherein the plurality of auxiliary flow units of the hydraulic circuit unit comprise:
a first auxiliary flow unit in communication with a first valve port of the one or more valve ports and configured to connect the wheel cylinders to the main brake unit and control the flow of the braking fluid;
a second auxiliary flow unit in communication with a second valve port of the one or more valve ports and configured to connect the electric pump unit to the first auxiliary flow unit and control the flow of the braking fluid;
a third auxiliary flow unit in communication with a third valve port of the one or more valve ports and configured to connect the first auxiliary flow unit with the electric pump unit and control the flow of the braking fluid; and
a fourth auxiliary flow unit configured to connect the storage unit to the third auxiliary flow unit, control the flow of the braking fluid and in communication with a fourth valve port unit.

2. The electro-hydraulic brake device of claim 1, wherein the main brake unit comprises:
a pedal cylinder unit configured to generate a first hydraulic pressure when a driver steps on a pedal of the vehicle;
a master cylinder unit configured to detect the driver's stepping on of the pedal and generate a second hydraulic pressure;
a first main hydraulic unit connected to the master cylinder unit and configured to guide a flow of the braking fluid to one or more first wheel cylinders of the plurality of wheel cylinders;
a second main hydraulic unit configured to connect the auxiliary brake unit with the master cylinder unit and configured to guide the flow of the braking fluid to one or more second wheel cylinders of the plurality of wheel cylinders; and
a third main hydraulic unit configured to connect or disconnect the second main hydraulic unit to or from the first main hydraulic unit.

3. The electro-hydraulic brake device of claim 2, wherein:
the one or more first wheel cylinders include at least one of the wheel cylinders disposed at a rear wheel of the vehicle, and
the one or more second wheel cylinders include at least one of the wheel cylinders disposed at a front wheel of the vehicle.

4. The electro-hydraulic brake device of claim 2, wherein the first main hydraulic unit and the auxiliary brake unit are connected to each other so that the braking fluid is movable therebetween.

5. The electro-hydraulic brake device of claim 1, wherein the first auxiliary flow unit comprises:
a first flow line configured to connect the main connection port to the main brake unit and guide the flow of the braking fluid;
a second flow line disposed at the block body unit, in communication with the first valve port unit and configured to connect the wheel connection port to the main connection port;
a third flow line configured to connect the wheel cylinder to the wheel connection port and guide the flow the braking fluid; and
a first flow valve disposed at the first valve port unit and configured to open or close the second flow line of the first auxiliary flow unit.

6. The electro-hydraulic brake device of claim 5, wherein the second auxiliary flow unit comprises:
a first flow line formed on the block body unit and configured to connect the pump port unit to the second flow line to guide the flow of the braking fluid; and
a second flow valve disposed at the second valve port and configured to open or close the first flow line of the second auxiliary flow unit.

7. The electro-hydraulic brake device of claim 6, wherein the second auxiliary flow unit comprises:
a second flow line disposed at the block body unit and configured to connect the storage connection port to the first flow line of the second auxiliary flow unit; and
a third flow line configured to connect the storage unit to the storage connection port.

8. The electro-hydraulic brake device of claim 5, wherein the third auxiliary flow unit comprises:
a first flow line disposed at the block body unit and configured to connect the second flow line of first auxiliary flow unit to the pump port unit and guide the flow of the braking fluid; and
a first flow valve disposed at the third valve port and configured to open or close the first flow line.

9. The electro-hydraulic brake device of claim 1, wherein the fourth auxiliary flow unit comprises:

a first flow line disposed at the block body unit, in communication with the fourth valve port unit, and configured to connect the storage unit to the third auxiliary flow unit and configured to guide the flow of the braking fluid; and a fourth flow valve disposed at the fourth valve port unit and configured to open or close the fourth flow line.

10. The electro-hydraulic brake device of claim 1, wherein the pump port unit includes:
an inlet part connected to the storage unit; and
an outlet part disposed at the side portion of the block body unit.

11. The electro-hydraulic brake device of claim 1, wherein the fourth valve port unit includes:
an inlet part disposed at the rear portion of the block body unit and connected to the storage unit, and
an outlet part of the fourth valve port unit connected to the third auxiliary flow unit.

12. An electro-hydraulic brake device comprising:
a main brake unit configured to provide a braking fluid to a plurality of wheel cylinders of a vehicle;
a storage unit connected to the main brake unit and configured to store the braking fluid; and
an auxiliary brake unit configured to provide the braking fluid to one or more of the wheel cylinders when an operational failure occurs to the main brake unit, and including a block unit and a hydraulic circuit unit disposed in the block unit,
wherein a hydraulic line of the hydraulic circuit unit is physically divided into a plurality of auxiliary flow units based on function, and the hydraulic circuit unit is connected to the main brake unit and the storage unit,
wherein the block unit comprises:
a block body unit;
a main connection port disposed at an upper portion of the block body unit and configured to guide a connection of the main brake unit;
a storage connection port disposed at the upper portion of the block body unit and configured to guide a connection of the storage unit;
a wheel connection port disposed at a front portion of the block body unit and configured to guide a connection of the wheel cylinder;
a pump port unit disposed at a side portion of the block body unit and configured to guide a flow of the braking fluid by an electric pump unit; and
one or more valve ports disposed at the block body unit and configured to guide the flow of the braking fluid by a valve unit in communication with the hydraulic circuit unit,
wherein the plurality of auxiliary flow units of the hydraulic circuit unit comprise:
a first auxiliary flow unit in communication with a first valve port of the one or more valve ports and configured to connect the wheel cylinders to the main brake unit and control the flow of the braking fluid;
a second auxiliary flow unit in communication with a second valve port of the one or more valve ports and configured to connect the electric pump unit to the first auxiliary flow unit and control the flow of the braking fluid; and
a third auxiliary flow unit in communication with a third valve port of the one or more valve ports and configured to connect the first auxiliary flow unit with the electric pump unit and control the flow of the braking fluid wherein the first auxiliary flow unit comprises:
a first flow line configured to connect the main connection port to the main brake unit and guide the flow of the braking fluid;
a second flow line disposed at the block body unit, in communication with the first valve port unit and configured to connect the wheel connection port to the main connection port;
a third flow line configured to connect the wheel cylinder to the wheel connection port and guide the flow the braking fluid; and
a first flow valve disposed at the first valve port unit and configured to open or close the second flow line of the first auxiliary flow unit,
wherein the third auxiliary flow unit comprises:
a first flow line disposed at the block body unit and configured to connect the second flow line of first auxiliary flow unit to the pump port unit and guide the flow of the braking fluid; and
a first flow valve disposed at the third valve port and configured to open or close the first flow line, and
wherein the first flow valve of the third auxiliary flow unit is configured to open the third flow line to allow the braking fluid to be discharged from the electric pump unit to the wheel cylinder.

13. An electro-hydraulic brake device comprising:
a main brake unit configured to provide a braking fluid to a plurality of wheel cylinders of a vehicle;
a storage unit connected to the main brake unit and configured to store the braking fluid; and
an auxiliary brake unit configured to provide the braking fluid to one or more of the wheel cylinders when an operational failure occurs to the main brake unit, and including a block unit and a hydraulic circuit unit disposed in the block unit,
wherein a hydraulic line of the hydraulic circuit unit is physically divided into a plurality of auxiliary flow units based on function, and the hydraulic circuit unit is connected to the main brake unit and the storage unit,
wherein the block unit comprises:
a block body unit;
a main connection port disposed at an upper portion of the block body unit and configured to guide a connection of the main brake unit;
a storage connection port disposed at the upper portion of the block body unit and configured to guide a connection of the storage unit;
a wheel connection port disposed at a front portion of the block body unit and configured to guide a connection of the wheel cylinder;
a pump port unit disposed at a side portion of the block body unit and configured to guide a flow of the braking fluid by an electric pump unit; and
one or more valve ports disposed at the block body unit and configured to guide the flow of the braking fluid by a valve unit in communication with the hydraulic circuit unit,
wherein the plurality of auxiliary flow units of the hydraulic circuit unit comprise:
a first auxiliary flow unit in communication with a first valve port of the one or more valve ports and configured to connect the wheel cylinders to the main brake unit and control the flow of the braking fluid;
a second auxiliary flow unit in communication with a second valve port of the one or more valve ports and configured to connect the electric pump unit to the first auxiliary flow unit and control the flow of the braking fluid;
a third auxiliary flow unit in communication with a third valve port of the one or more valve ports and configured to connect the first auxiliary flow unit with the electric pump unit and control the flow of the braking fluid; and wherein the third valve port includes:
an inlet part disposed at a rear portion of the block body unit and connected to the first auxiliary flow unit; and
an outlet part connected to the third auxiliary flow unit.

\* \* \* \* \*